United States Patent
Yaguchi et al.

(10) Patent No.: US 7,042,190 B2
(45) Date of Patent: May 9, 2006

(54) MOTOR CONTROL APPARATUS AND MOTOR CONTROL METHOD

(75) Inventors: Hideaki Yaguchi, Toyota (JP); Sojiro Yokoyama, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 100 days.

(21) Appl. No.: 10/758,125

(22) Filed: Jan. 16, 2004

(65) Prior Publication Data

US 2004/0150359 A1  Aug. 5, 2004

(30) Foreign Application Priority Data

Jan. 16, 2003  (JP) .................................. 2003-008401

(51) Int. Cl.
*H02P 3/18*  (2006.01)

(52) U.S. Cl. ............... 318/727; 318/603; 318/432; 318/661; 318/254; 318/605

(58) Field of Classification Search ................ 318/138, 318/254, 439, 727, 432, 603, 605, 661, 799
See application file for complete search history.

(56) References Cited

U.S. PATENT DOCUMENTS

| | | | | |
|---|---|---|---|---|
| 5,760,359 A | * | 6/1998 | Nakano et al. | 318/603 |
| 6,008,601 A | * | 12/1999 | Sugiyama | 318/254 |
| 6,400,116 B1 | * | 6/2002 | Chen et al. | 318/599 |
| 6,469,463 B1 | * | 10/2002 | Chen et al. | 318/439 |
| 6,541,939 B1 | * | 4/2003 | Kishibe et al. | 318/799 |
| 6,781,333 B1 | * | 8/2004 | Koide et al. | 318/432 |

FOREIGN PATENT DOCUMENTS

| | | |
|---|---|---|
| JP | A 1-174914 | 7/1989 |
| JP | A 1-184914 | 7/1989 |
| JP | A 4-204161 | 7/1992 |
| JP | B2 254-1169 | 7/1996 |
| JP | A 9-126809 | 5/1997 |
| JP | A 10-262387 | 9/1998 |
| JP | A 2001-95283 | 4/2001 |
| JP | A 2001-165707 | 6/2001 |
| JP | A 2001-211698 | 8/2001 |

* cited by examiner

*Primary Examiner*—Rina Duda
(74) *Attorney, Agent, or Firm*—Kenyon & Kenyon

(57) ABSTRACT

A control device measures time intervals T1 to T12 from the reference time until when each of the rotational angles θbn1, θbn2 output from each of resolvers becomes n×60 degrees (n=1 to 12, i.e., 60 degrees to 720 degrees). Then, the control device calculates a deviation angle Δθn at each of the rotational angles at the intervals of 60 degrees by calculating T1/T12 to T11/T12 using the measured T1 to T12. By substituting the calculated deviation angle Δθn into an equation, n×60°+Δθn (n=1 to 11), the control device corrects the rotational angles at the intervals of 60 degrees. The control device generates each of drive signals DRV1, DRV2 using each of the corrected rotational angles, and outputs each of the drive signals DRV1, DRV2 to each of inverters. The inverters drive each of AC motors (M1, M2) based on each of the drive signals DRV1, DRV2.

16 Claims, 20 Drawing Sheets

MOTOR CONTROL APPARATUS AND MOTOR CONTROL METHOD

INCORPORATION BY REFERENCE

The disclosure of Japanese Patent Application No. 2003-8401 filed on Jan. 16, 2003, including the specification, drawings and abstract is incorporated herein by reference in its entirety.

BACKGROUND OF THE INVENTION

1. Field of the Invention

The invention relates to a motor control apparatus and a motor control method which control a motor by correcting an output of a resolver.

2. Description of the Related Art

In order to continuously rotate a rotor of a motor using a rotating magnetic field, the rotational position of the rotor is detected. The rotational position of the rotor is detected using a resolver fitted to a rotating shaft.

In other words, the resolver detects the rotational position of the rotor which is rotated, and outputs a position signal corresponding to each rotational position of the rotor as an analogue signal. A central processing unit (hereinafter, referred to as CPU) of a computer converts the analogue signal from the resolver to a digital signal. Based on the digital signal obtained by conversion, the CPU generates a drive signal for supplying an alternating electric current for generating the rotating magnetic field to a stator coil (generally composed of a three-phase coil) which is provided at an outer periphery portion of the rotor. Then, the CPU outputs the drive signal to an inverter. Based on the drive signal output from the CPU, the inverter supplies a predetermined alternating electric current to each phase of the stator coil with predetermined timing. Thus, the stator coil generates the rotating magnetic field, and the rotor is rotated by the rotating magnetic field generated by the stator coil.

However, since a deviation of the output of the resolver such as a 0.5th-order deviation and a first-order deviation generally occurs, the rotational angle output from the resolver is not linearly increased with time. Also, a change in the rotational speed of the rotor may be caused, which may cause the deviation of the output of the resolver.

Thus, Japanese Patent Laid-Open Publication No. 2001-165707 discloses a technology in which the deviation of the output of the resolver is corrected using the rotational speed of the rotor.

However, the Japanese Patent Laid-Open Publication No. 2001-165707 does not disclose a motor control using the output of the resolver which is corrected using the rotational speed of the rotor. Therefore, the motor control has not been improved.

SUMMARY OF THE INVENTION

It is an object of the invention to provide a motor control apparatus and a motor control method which correct an output of a resolver, and control a motor using the corrected output of the resolver.

A first aspect of the invention relates to a motor control apparatus including a rotational position sensor, correction means, and control means. The rotational position sensor detects a rotational position of a rotor of a motor when a rectangular wave control of the motor is executed. The correction means corrects an output of the rotational position sensor on the basis of a difference in a time interval from a reference time until each control time of the motor in the rectangular wave. The control means executes the rectangular wave control of the motor based on the output of the rotational position sensor which is corrected by the correction means.

The correction means may correct the output of the rotational position sensor considering a change in a voltage phase command that decides a period during which a voltage is applied to each phase of the motor when the voltage phase command is changed.

The correction means may correct the output of the rotational position sensor considering a change in a rotational speed of the rotor when the rotational speed is changed.

The correction means may correct the output of the rotational position sensor considering a change in a voltage phase command that decides a period during which a voltage is applied to each phase of the motor and a change in a rotational speed of the rotor.

The correction means may correct the output of the rotational position sensor considering a change in a rotational speed of the rotor by using a time required for rotating the rotor one time in a previous control cycle and a time required for rotating the rotor one time in a present control cycle.

The correction means may correct the output of the rotational position sensor according to a kind of a control method for the motor.

In the motor control apparatus according to the invention, the output of the rotational position sensor is corrected on the basis of the difference between the time interval from the reference time until the control time at which the motor is controlled based on the output of the rotation position sensor and the time interval from the reference time until the true control time at which the motor needs to be controlled in the rectangular wave control. Also, the output of the rotational position sensor is corrected considering a change in the voltage phase command for each phase of the motor. Further, the output of the rotational position sensor is corrected considering a change in the rotational speed of the motor. Further, the output of the rotational position sensor is corrected considering a change in the voltage phase command for each phase of the motor and a change in the rotational speed of the motor.

The rectangular wave control of the motor is executed using the output of the rotational position sensor which is corrected by each of the correction method.

Thus, according to the invention, even when the output of the rotational position sensor has a deviation, a failure of the motor control can be prevented so that the motor can be driven. Also, even when the voltage phase command for each phase of the motor or the rotational speed of the motor is changed, a failure of the motor control can be prevented so that the motor can be driven.

A second aspect of the invention relates to a motor control method including the steps of: detecting a rotational position of a rotor of a motor when a rectangular wave control of the motor is executed, correcting an output of the rotational position sensor on the basis of a difference between a time interval from a reference time until a control time at which the motor is controlled based on the output of the rotational position sensor and a time interval from the reference time until a true control time at which the motor needs to be controlled in the rectangular wave control, and executing the rectangular wave control of the motor based on the output of the rotational position sensor which is corrected by the correction means.

A third aspect of the invention relates to a motor control apparatus including a rotational position sensor and a controller. The rotational position sensor detects a rotational position of a rotor of a motor when a rectangular wave control of the motor is executed. The controller corrects an output of the rotational position sensor on the basis of a difference between a time interval from a reference time until a control time at which the motor is controlled based on the output of the rotational position sensor and a time interval from the reference time until a true control time at which the motor needs to be controlled in the rectangular wave control. The controller executes the rectangular wave control of the motor based on the output of the rotational position sensor which is corrected.

A fourth aspect of the invention relates to a motor control apparatus including a rotational position sensor, correction means, and control means. The rotational position sensor detects a rotational position of a rotor of a motor when a rectangular wave control of the motor is executed. The correction means corrects an output of the rotational position sensor on the basis of a difference between a time interval from a reference time until a control time at which the motor is controlled based on the output of the rotational position sensor and a time interval from the reference time until a true control time at which the motor needs to be controlled in the rectangular wave control. The control means executes the rectangular wave control of the motor based on the output of the rotational position sensor which is corrected by the correction means.

DETAILED DESCRIPTION OF THE PREFERRED EMBODIMENTS

Figure 1:
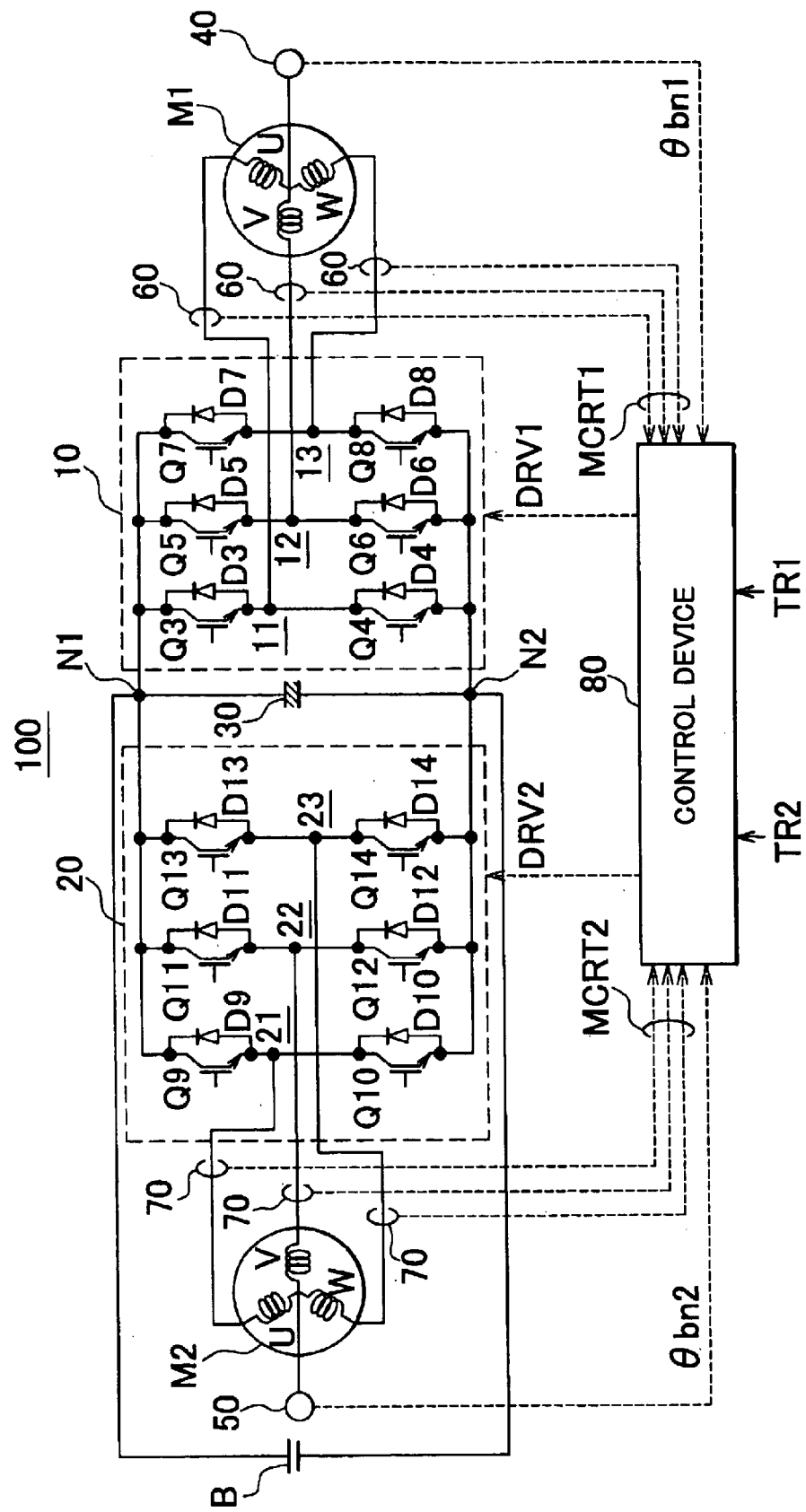
FIG. 1 is a schematic block diagram of a motor control apparatus according to a first embodiment of the invention.

A motor control apparatus according to each embodiment of the invention will be described in detail with reference to accompanying drawings. In the drawings, like components are denoted by like reference numerals, and description thereof will not be repeated.

[First Embodiment]

As shown in FIG. 1, a motor control apparatus 100 according to a first embodiment of the invention includes a DC power source B, inverters 10, 20, a capacitor 30, resolvers 40, 50, electric current sensors 60, 70, and a control device 80.

The inverter 10 includes a U-phase arm 11, a V-phase arm 12, and a W-phase arm 13. The U-phase arm 11, the V-phase arm 12, and the W-phase arm 13 are connected in parallel between a node N1 and a node N2.

The U-phase arm 11 includes NPN transistors Q3, Q4 that are connected in series. The V-phase arm 12 includes NPN transistors Q5, Q6 that are connected in series. The W-phase arm 13 includes NPN transistors Q7, Q8 that are connected in series. Each of diodes D3 to D8 for causing an electric current to flow from an emitter side to a collector side is connected to a portion between a collector and an emitter in each of the NPN transistors Q3 to Q8.

The inverter 20 includes a U-phase arm 21, a V-phase arm 22, and a W-phase arm 23. The U-phase arm 21, the V-phase arm 22, and the W-phase arm 23 are connected in parallel between the node N1 and the node N2.

The U-phase arm 21 includes NPN transistors Q9, Q10 that are connected in series. The V-phase arm 22 includes NPN transistors Q11, Q12 that are connected in series. The W-phase arm 23 includes NPN transistors Q13, Q14 that are connected in series. Each of diodes D9 to D14 for causing an electric current to flow from an emitter side to a collector side is connected to a portion between a collector and an emitter in each of the NPN transistors Q9 to Q14.

An intermediate point of each phase arm of the inverter 10 is connected to each phase end of each phase coil of an AC motor M1. An intermediate point of each phase arm of the inverter 20 is connected to each phase end of each phase coil of an AC motor M2. That is, each of the AC motors M1, M2 is a three-phase permanent magnetic motor in which one end of each of a U-phase coil, a V-phase coil, and a W-phase coil is connected to a common center point. The other end of the U-phase coil of the AC motor M1 is connected to the intermediate point between the NPN transistors Q3, Q4. The other end of the V-phase coil is connected to the intermediate point between the NPN transistors Q5, Q6. The other end of the W-phase coil is connected to the intermediate point between the transistors Q7, Q8. The other end of the U-phase coil of the AC motor M2 is connected to the intermediate point between the NPN transistors Q9, Q10. The other end of the V-phase coil is connected to the intermediate point between the NPN transistors Q11, Q12. The other end of the W-phase coil is connected to the intermediate point between the NPN transistors Q13, Q14.

The capacitor 30 is connected to a portion between the node N1 and the node N2 so as to be in parallel with the inverters 10, 20.

A DC power source B includes a secondary cell such as a nickel-hydrogen battery or a lithium-ion battery. The inverter 10 converts a DC voltage from the capacitor 30 to an AD voltage based on a drive signal DRV1 output from the control device 80 so as to drive the AD motor M1. The inverter 20 converts the DC voltage from the capacitor 30 to the AD voltage based on a drive signal DRV2 output from the control device 80 so as to drive the AD motor M2.

The capacitor 30 smoothes the DC voltage from the DC power source B, and supplies the smoothed DC voltage to the inverters 10, 20. The resolver 40 is fitted to the rotating shaft of the AD motor M1. The resolver 40 detects a rotational angle θbn1 of the rotor of the AD motor M1, and outputs the detected rotational angle θbn1 to the control device 80. The resolver 50 is fitted to the rotating shaft of the AD motor M2. The resolver 50 detects a rotational angle θbn2 of the rotor of the AD motor M2, and outputs the detected rotational angle θbn2 to the control device 80.

The electric current sensors 60 detects a motor electric current MCRT1 which flows to the AD motor M1, and outputs the detected motor electric current MCRT1 to the control device 80. The electric current sensors 70 detect a motor electric current MCRT2 which flows to the AD motor M2, and outputs the detected motor electric current MCRT2 to the control device 80.

In FIG. 1, three electric current sensors 60 and three electric current sensors 70 are provided. However, it is sufficient to provide at least two electric current sensors 60 and at least two electric current sensors 70.

The control device 80 corrects the rotational angle θbn1 output from the resolver 40 using a method that will be described later. The control device 80 generates the drive signal DRV1 for driving the NPN transistors Q3 to Q8 of the inverter 10 using a corrected rotational angle θn1 and a torque command value TR1 output from an external electrical control unit (hereinafter, referred to as ECU), and outputs the generated drive signal DRV1 to the NPN transistors Q3 to Q8.

The control device 80 corrects the rotational angle θbn2 output from the resolver 50 using the method that will be described later. The control device 80 generates the drive signal DRV2 for driving the NPN transistors Q9 to Q14 of the inverter 20 using a corrected rotational angle θn2 and a torque command value TR2 output from an external ECU, and outputs the generated drive signal DRV2 to the NPN transistors Q9 to Q14.

Figure 2:
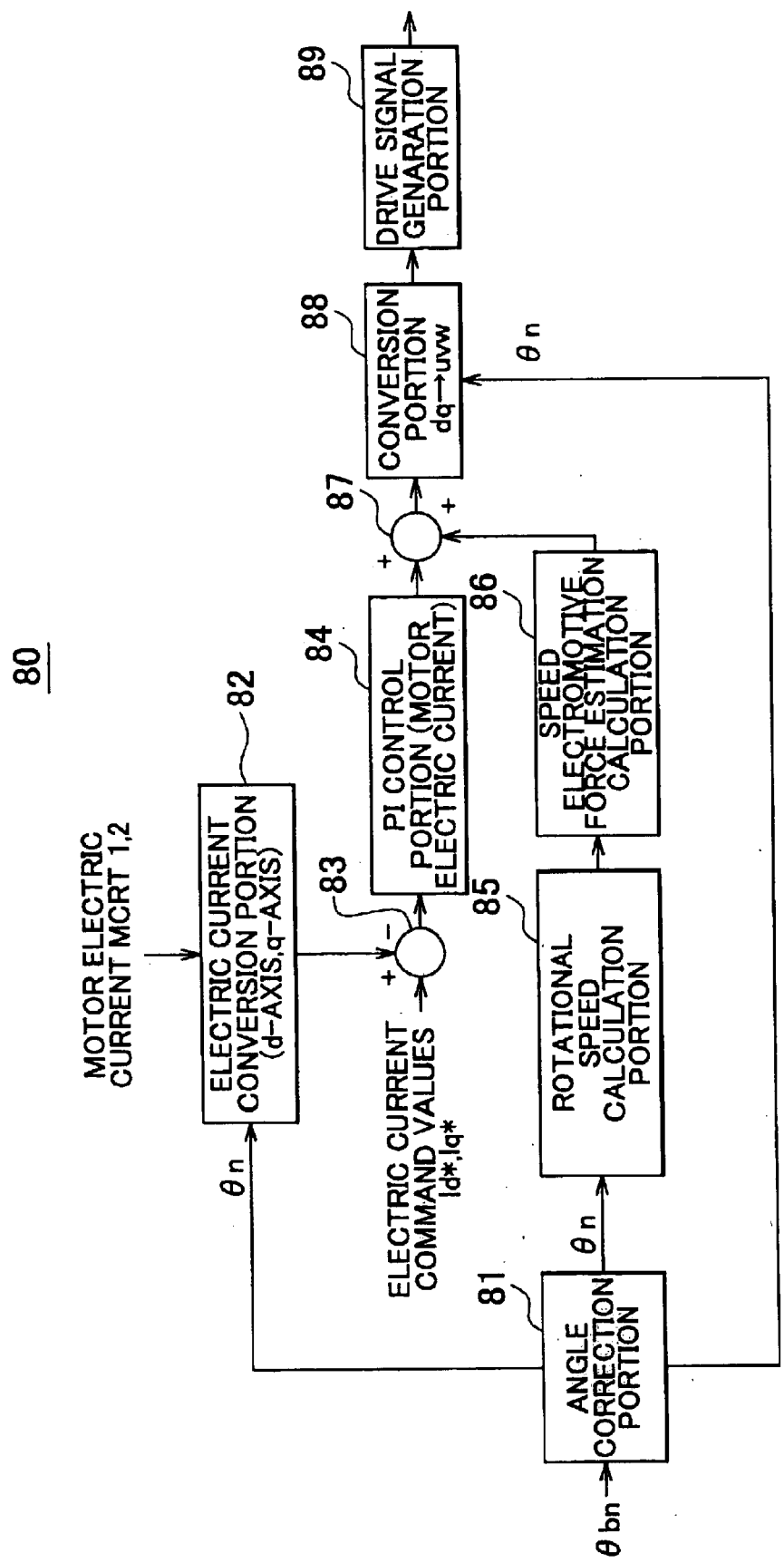
FIG. 2 is a functional block diagram describing functions of the control device shown in FIG. 1.

FIG. 2 is a functional block diagram describing functions of the control device 80 which generates the drive signals DRV1, DRV2. As shown in FIG. 2, the control device 80 includes an angle correction portion 81, an electric current conversion portion 82, a subtracting device 83, a PI control portion 84, a rotational speed calculation portion 85, a speed electromotive force estimation calculation portion 86, a summing device 87, a conversion portion 88, and a drive signal generation portion 89.

The angle correction portion 81 receives the rotational angle θbn (θbn1 or θbn2) output from the resolver 40 (or the resolver 50), corrects the rotational angle θbn using the method that will be described later, and outputs the corrected rotational angle θn (θn1 or θn2) to the electric current conversion portion 82, the rotational speed calculation portion 85, and the conversion portion 88.

The electric current conversion portion 82 performs three-phase to two-phase conversion of the motor electric current MCRT1 (or the electric current MCRT2) detected by the electric current sensors 60 (or the electric current sensors 70) using the rotational angle θn1 (or θn2) output from the angle correction portion 81. That is, the electric current conversion portion 82 converts the three-phase motor electric current MCRT1 (or the motor electric current MCRT2) flowing to each phase of the three-phase coil of the AC motor M1 (or the AC motor M2) into electric current values Id, Iq flowing to a d-axis and a q-axis using the rotational angle θn1 (or θn2). Then, the electric current conversion portion 82 outputs the electric current values Id, Iq to the subtracting device 83.

The subtracting device 83 calculates deviations ΔId, ΔIq by subtracting the electric current values Id, Iq, which are output from the electric current conversion portion 82, from electric current command values Id*, Iq*, which are for the AC motor M1 (or the AC motor M2) to output torque specified by the torque command value TR1 (or the torque command value TR2). The PI control portion 84 calculates a manipulation amount for adjusting the motor electric current by using a PI gain with respect to the deviations ΔId, ΔIq.

The rotational speed calculation portion 85 calculates the rotational speed of the AC motor M1 (or the AC motor M2) based on the rotational angle Δn1 (or the rotational angle Δn2) output from the angle correction portion 85. Then, the rotational speed calculation portion 85 outputs the calculated rotational speed to the speed electromotive force estimation calculation portion 86. The speed electromotive force estimation calculation portion 86 calculates an estimated speed electromotive force value based on the rotational speed output from the rotational speed calculation portion 85.

The summing device 87 calculates voltage manipulation amounts Vd, Vq by summing the manipulation amount for adjusting the motor electric current output from the PI control portion 84 and the estimated speed electromotive force value output from the speed electromotive force estimation calculation portion 86. The conversion portion 88 performs two-phase to three-phase conversion of the voltage manipulation amounts Vd, Vq output from the summing device 87 using the rotational angle θn1 (or the rotational angle θn2) output from the angle correction portion 81. That is, the conversion portion 88 converts the manipulation amounts Vd, Vq of the voltage applied to the d-axis and the q-axis into the manipulation amounts of the voltage applied to the three-phase coil (the U-phase coil, the V-phase coil, and the W-phase coil) of the AC motor M1 (or the AC motor M2) using the rotational angle θn1 (or the rotational angle θn2). The drive signal generation portion 89 generates the drive signals DRV1, DRV2 based on the output of the conversion portion 88.

Figure 3:
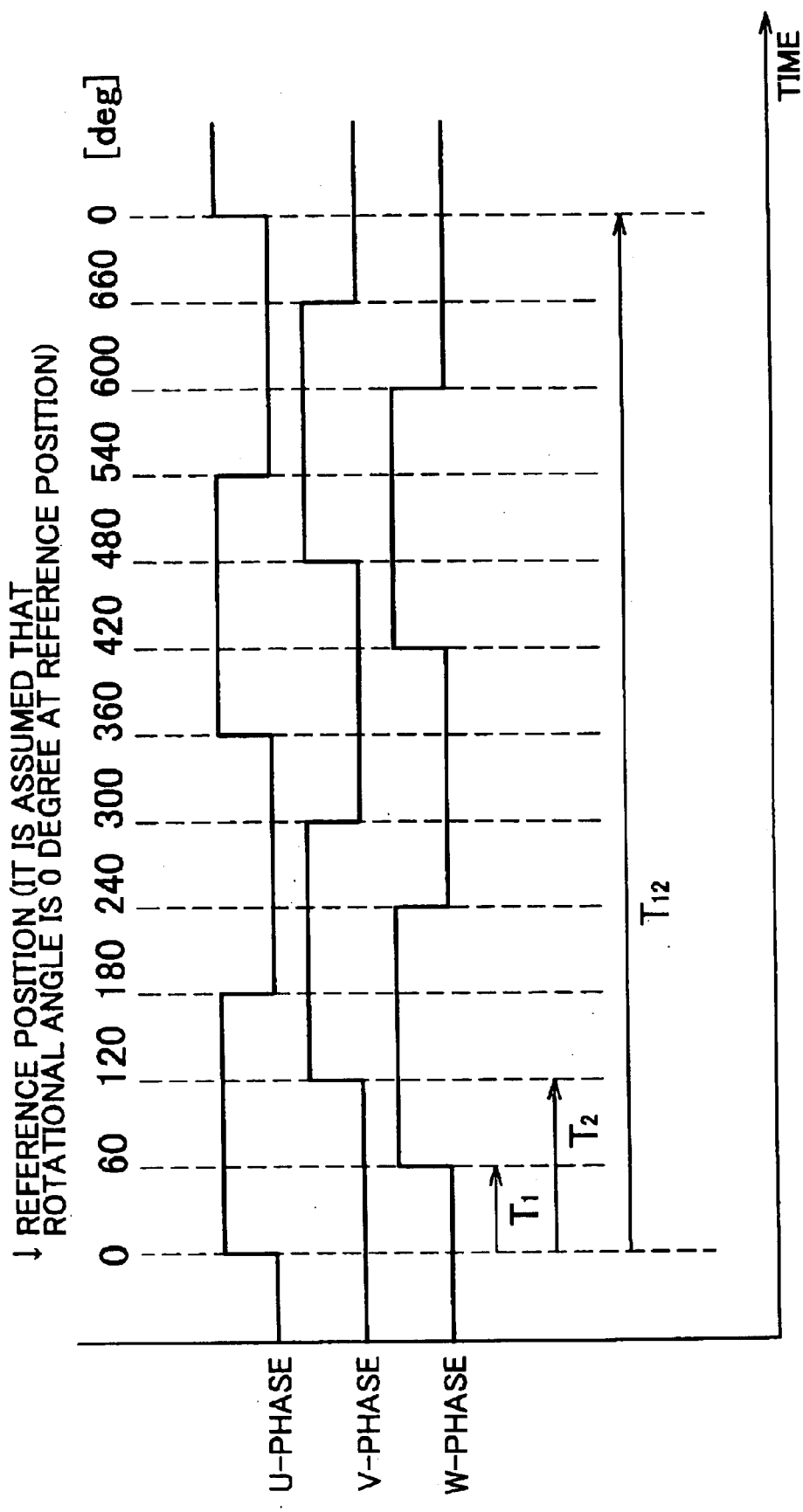
FIG. 3 is a timing chart for a voltage command for each of a U-phase, a V-phase, and a W-phase of an AC motor shown in FIG. 1.
Figure 4:
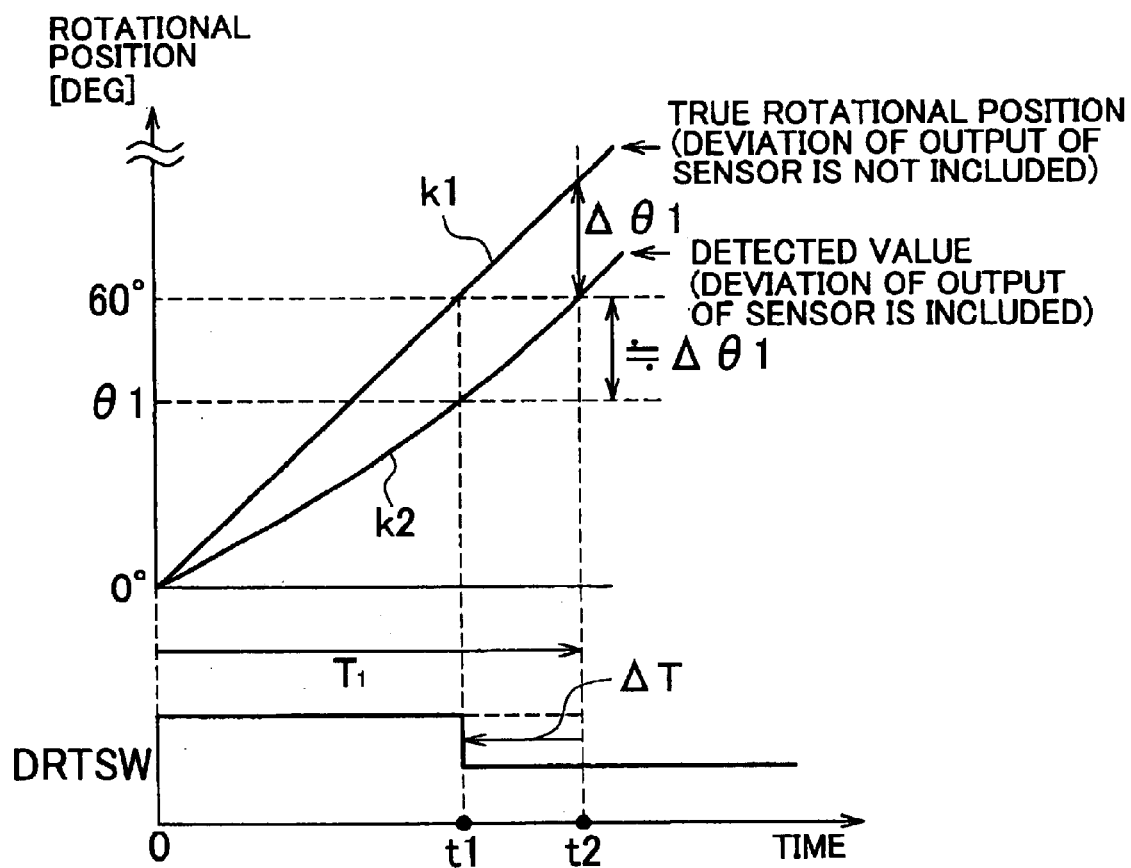
FIG. 4 is a timing chart for an output of a resolver shown in FIG. 1 and the voltage command.

A rotational angle correction method in the angle correction portion 81 will be described with reference to FIG. 3 and FIG. 4. FIG. 3 shows a switching command for the U-phase, the V-phase, and the W-phase of each of the AC motors M1, M2 in the rectangular wave control. One turn (360 degrees) of each of the resolvers 40, 50 corresponds to 720 electrical degrees. Therefore, the switching command for each of the U-phase, the V-phase, and the W-phase of each of the AC motors M1, M2 is inverted every 180 degrees. Accordingly, the phase whose energization/non-energization state is changed is switched among the U-phase, the V-phase, and the W-phase of each of the AC motors M1, M2 every 60 degrees. Hereinafter, a time at which the state of the phase is switched from the energization state to the non-energization state, or from the non-energization state to the energization state will be referred to as "a switching time".

Time intervals between the switching times at the intervals of 60 degrees are equal when the output of each of the resolvers 40, 50 does not have a deviation (on the assumption that the rotational speed is constant). Accordingly, time intervals from a reference time which is set using the U-phase as a reference phase until the switching time in the V-phase and the switching time in the W-phase at the intervals of 60 degrees are measured, and the deviation of the output of each of the resolvers 40, 50 is corrected using the measured time intervals.

As described above, one turn of each of the resolvers 40, 50 corresponds to 720 electrical degrees. Therefore, 720 electrical degrees corresponds to one cycle. In one cycle, there are 12 switching times. Accordingly, the angle correction portion 81 measures time intervals T1 to T12 from the reference time until when the rotational angle $\theta bn$ output from the resolver 40 (or the resolver 50) becomes $n \times 60$ degrees (n=1 to 12, i.e., 60 degrees to 720 degrees (0 degree)), using a timer included in the angle correction portion 81.

The angle correction portion 81 substitutes the measured time interval T1 to T12 into an equation described below, and calculates a deviation $\Delta\theta n$ (n=1 to 11) at each of the rotational angles of $n \times 60$ degrees (60 degrees to 720 degrees (0 degree)).

[Equation 1]

$$\Delta\theta n = n \times 60° - 720° \times \frac{Tn}{T12} \quad (1)$$

A method of correcting the rotational angle of 60 degrees will be described with reference to FIG. 4. In the case where the output of the resolver 40 (or the resolver 50) shows a true rotational position shown by a straight line k1, when the energization/non-energization state is changed at time t1 at which the rotational angle output from the resolver 40 (or the resolver 50) becomes 60 degrees, the energization/non-energization state can be changed in synchronization with a true fall of a switching command DRTSW.

However, in the case where the output of the resolver 40 (or the resolver 50) shows a rotational position deviated from the true rotational position as shown by a curved line k2, when the energization/non-energization state is changed at time t2 at which the rotational angle output from the resolver 40 (or the resolver 50) becomes 60 degrees, the change of the energization/non-energization state lags behind the fall of the switching command DRTSW by $\Delta T$. Therefore, a period during which the alternating electric current is supplied to the U-phase coil becomes longer.

In order to change the energization/non-energization state in synchronization with the fall of the switching command DRTSW, a rotational angle $\theta 1$ on the curved line k2 at time t1 is obtained, and the energization/non-energization state is changed at a time when the rotational angle output from the resolver 40 (or the resolver 50) becomes $\theta 1$.

Since the time interval T1 measured by the angle correction portion 81 is a time interval from time 0 to time t2, a rotational angle deviated from 60 degrees on the straight line k1 is obtained by an equation $720° \times T1/T12$. A deviation angle $\Delta\theta 1$ on the straight line k1 is obtained by an equation $60° - 720° \times T1/T12$. That is, the deviation angle $\Delta\theta 1$ is calculated by substituting the measured time intervals T1 and T12, and n=1 into the equation (1).

The calculated deviation angle $\Delta\theta 1$ is substantially equal to a difference between the rotational angle on the straight line k1 and the rotational angle on the curved line k2 at time t1. Therefore, the rotational angle $\theta 1$ is obtained by an equation $60° + \Delta\theta 1$.

Accordingly, the energization/non-energization state can be changed in synchronization with the fall of the switching command DRTSW by changing the energization/non-energization state at the time when the rotational angle output from the resolver 40 (or the resolver 50) becomes $\theta 1$ even when the output from the resolver 40 (or the resolver 50) has a deviation.

Similarly, when the rotational angle of 120 degrees on the straight line k1 is converted into the rotational angle on the line k2, an equation $2 \times 60° + \Delta\theta 2$ is used. In geneal, when the rotational angles of $n \times 60$ degrees on the straight line k1 are converted into the rotational angles on the curved line k2, the following equation is used.

[Equation 2]

$$\theta n = n \times 60° + \Delta\theta n \quad (2)$$

Accordingly, the angle correction portion 81 measures the time intervals T1 to T12 from the reference time until when the rotational angle output from the resolver 40 (or the resolver 50) becomes $n \times 60$ degrees (n=1 to 12, i.e., 60 degrees to 720 degrees (0 degree)), and calculates the deviation angles $\Delta\theta 1$ to $\Delta\theta 11$ by substituting the measured time intervals T1 to T12 into the equation (1). Then, the angle correction portion 81 calculates the corrected rotational angles $\theta 1$ to $\theta 11$ by substituting the deviation angles $\Delta\theta 1$ to $\Delta\theta 11$ into the equation (2).

The rotational angle of 720 degrees on the straight line k1 is not converted into the rotational angle on the curved line k2 for the following reason. In general, in the case of the output deviation of the resolver (a 0.5th-order deviation, a first-order deviation, or the like), the rotational angle of 0 degree and the rotational angle of 720 degrees output from the resolver match the true rotational angles, and the rotational angles other than 0 degree and 720 degrees output from the resolver are deviated from the true rotational angles. Therefore, the rotational angle of 720 degrees on the straight line k1 does not need to be converted into the rotational angle on the curved line k2. Accordingly, the angle correction portion 81 calculates each of the deviation angles $\Delta\theta 1$ to $\Delta\theta 11$ at each of the rotational angles of $n \times 60$ degrees (n=1 to 11, i.e., 60 degrees to 660 degrees) using the equation (1) on the assumption that the rotational angle output from the resolver at the time interval T12 matches the rotational angle of 720 degrees on the straight line k1.

Also, in the rotational angle correction method described above, the time intervals T1 to T12 are measured, and the rotational angles of $n \times 60$ degrees output from the resolver are corrected using the measured time intervals T1 to T12 in one cycle (0 degree to 720 degrees). Then, the switching command for each phase of each of the AC motors M1, M2 is changed using the corrected rotational angles in the next one cycle (0 degree to 720 degree).

Figure 5:
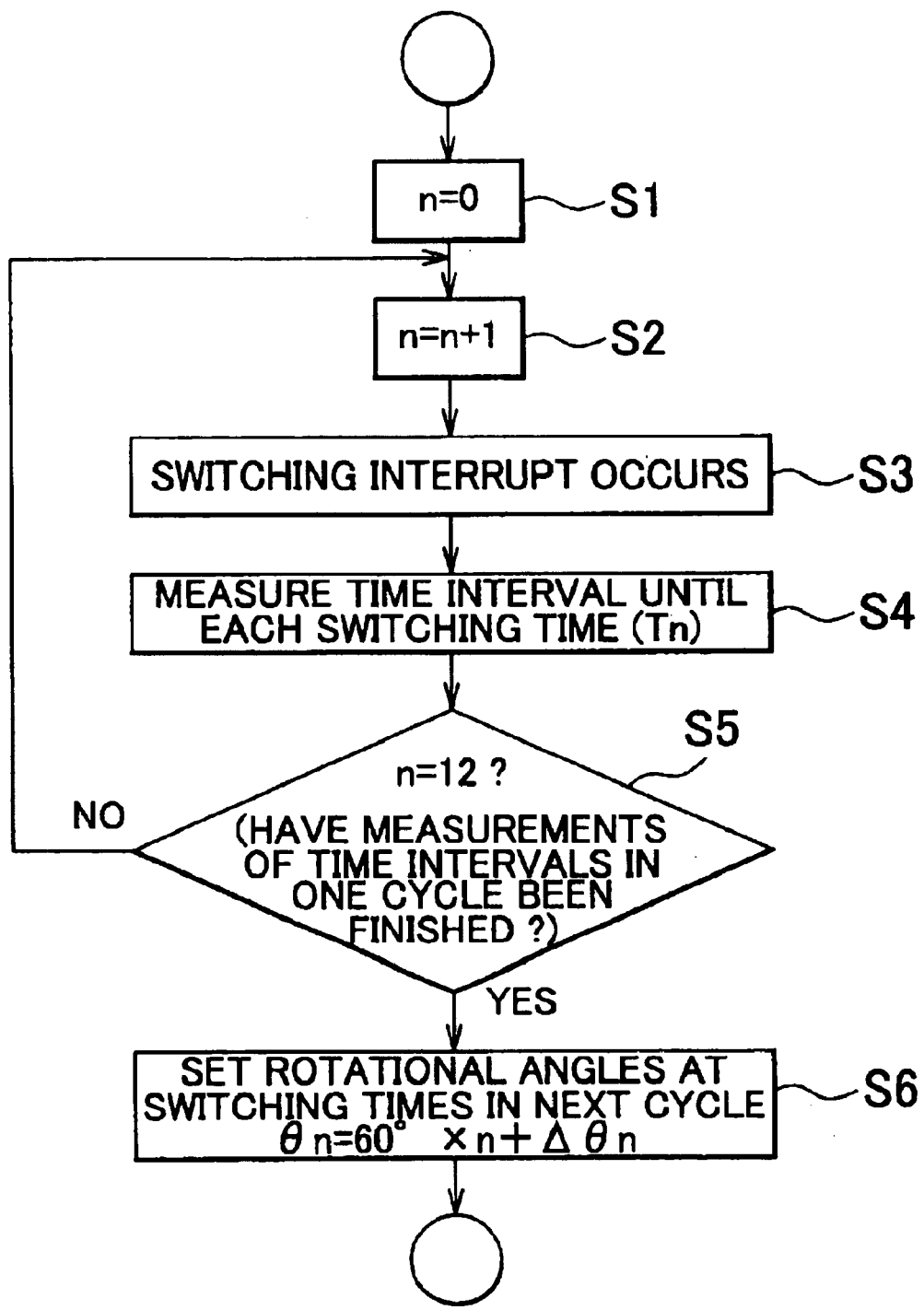
FIG. 5 is a flowchart describing a rotational angle correction method according to the first embodiment of the invention.

The rotational angle correction method according to the first embodiment will be described with reference to FIG. 5. After a series of operations is started, the angle correction portion 81 sets the value of n to 0 (i.e., n=0) (step S1). Then, the angle correction portion 81 sets the value of n to 1 (i.e., n=n+1) (step S2). Then, a switching interrupt occurs (step S3). Then, the angle correction portion 81 measures the time interval T1 from the reference time until when the rotational angle θbn (θbn1 or θbn2) output from the resolver 40 or the resolver 50 becomes 60 degrees, based on the rotational angle θbn (θbn1 or θbn2) (step S4). Then, the angle correction portion 81 determines whether the value of n is 12 (i.e., n=12) (step S5). When it is determined that the value of n is not 12, step S2 to step S5 are repeatedly performed. That is, step S2 to step 5 are repeatedly performed until all the time intervals T1 to T12 are measured.

When it is determined that the value of n is 12, the angle correction portion 81 corrects the rotational angles at the intervals of 60 degrees using the equation (1) and the equation (2) (step S6). Thus, the operation of correcting the rotational angles is finished.

The operation of the motor control apparatus 100 will be described again with reference to FIG. 1 and FIG. 2. After a series of operations is started, the resolver 40 outputs the rotational angle θbn1 of the rotor of the AC motor M1 to the control device 80. The resolver 50 outputs the rotational angle θbn2 of the rotor of the AC motor M2 to the control device 80. The electric current sensor 60 detects the motor electric current MCRT1 flowing to each phase of the AC motor M1, and outputs the detected electric current MCRT1 to the control device 80. The electric current sensor 70 detects the motor electric current MCRT2 flowing to each phase of the AC motor M2, and outputs the detected electric current MCRT2 to the control device 80.

The control device 80 calculates, according to the torque command value TR1 received from the external ECU, the electric current command values Id1*, Iq1* which are for the AC motor M1 to output torque specified by the torque command value TR1. Also, the control device 80 calculates, according to a torque command value TR2 received from the external ECU, electric current command values Id2*, Iq2* which are for the AC motor M2 to output torque specified by the torque command value TR2.

The angle correction portion 81 measures the time intervals T1 to T12 based on the rotational angle θbn1 output from the resolver 40, corrects the rotational angle θbn1 using the measured time intervals T1 to T12 by the method described above, and outputs the corrected rotational angle θn1 to the electric current conversion portion 82, the rotational speed calculation portion 85, and the conversion portion 88. Also, the angle correction portion 81 measures the time intervals T1 to T12 based on the rotational angle θbn2 output from the resolver 50, corrects the rotational angle θbn2 using the measured time intervals T1 to T12 by the method described above, and outputs the corrected rotational angle θn2 to the electric current conversion portion 82, the rotational speed calculation portion 85, and the conversion portion 88.

The electric current conversion portion 82 converts the motor electric current MCRT1 output from the electric current sensor 60 into the electric current values Id1, Iq1 flowing to the d-axis and the q-axis of the AC motor M1, using the rotational angle θn1 output from the angle correction portion 81. Also, the electric current conversion portion 82 converts the motor electric current MCRT2 output from the electric current sensor 70 into the electric current values Id2, Iq2 flowing to the d-axis and the q-axis of the AC motor M2, using the rotational angle θn2 output from the angle correction portion 81.

The subtracting device 83 calculates deviations ΔId1, ΔIq1 by subtracting the electric current values Id1, Iq1 obtained by conversion by the electric current conversion portion 82 from the electric current command values Id1*, Iq1* calculated by the control device 80. Also, the subtracting device 83 calculates deviations ΔId2, ΔIq2 by subtracting the electric current values Id2, Iq2 obtained by conversion by the electric current conversion portion 82 from the electric current command values Id2*, Iq2* calculated by the control device 80.

The PI control portion 84 calculates the manipulation amount for adjusting the motor electric current of the AC motor M1 using the PI gain with respect to the deviations ΔId1, ΔIq1. Also, the PI control portion 84 calculates the manipulation amount for adjusting the motor electric current of the AC motor M2 using the PI gain with respect to the deviations ΔId2, ΔIq2.

The rotational speed calculation portion 85 calculates a rotational speed ω01 of the AC motor M1 based on the rotational angle θn1 output from the angle correction portion 81. Also, the rotational speed calculation portion 85 calculates a rotational speed ω02 of the AC motor M2 based on the rotational angle θn2 output from the angle correction portion 81. The speed electromotive force estimation calculation portion 86 calculates an estimated speed electromotive force value in the AC motor M1 based on the rotational speed 101 output from the rotational speed calculation portion 85. Also, the speed electromotive force estimation calculation portion 86 calculates an estimated speed electromotive force value in the AC motor M2 based on the rotational speed ω02 output from the rotational speed calculation portion 85.

The summing device 87 calculates the voltage manipulation amounts Vd1, Vq1 of the AC motor M1 by summing the manipulation amounts for adjusting the motor electric current of the AC motor M1 output from the PI control portion 84 and the estimated speed electromotive force value in the AC motor M1 output from the speed electromotive force estimation calculation portion 86. Also, the summing device 87 calculates the voltage manipulation amounts Vd2, Vq2 of the AC motor M2 by summing the manipulation amounts for adjusting the motor electric current of the AC motor M2 output from the PI control portion 84 and the estimated speed electromotive force value in the AC motor M2 output from the speed electromotive force estimation calculation portion 86.

The conversion portion 88 calculates voltages Vu1, Vv1, Vw1 by performing two-phase to three-phase conversion of the voltage manipulation amounts Vd1, Vq1 output from the summing device 87 using the rotational angle θn1 output from the angle correction portion 81. Also, the conversion portion 88 calculates voltages Vu2, Vv2, Vw2 by performing two-phase to three-phase conversion of the voltage manipulation amounts Vd2, Vq2 output from the summing device 87 using the rotational angle θn2 output from the angle correction portion 81. The drive signal generation portion 89 generates the drive signal DRV1 based on the voltages Vu1, Vv1, Vw1 output from the conversion portion 88, and generates the drive signal DRV2 based on the voltages Vu2, Vv2, Vw2 output from the conversion portion 88. Then, the drive signal generation portion 89 outputs the generated drive signal DRV1 to the NPN transistors Q3 to Q8, and outputs the generated drive signal DRV2 to the NPN transistors Q9 to Q14.

The NPN transistors Q3 to Q8 are turned on and off according to the drive signal DRV1. The inverter 10 switches between supply and non-supply of the electric current flowing to each phase of the AC motor M1 in synchronization with the true rise and fall of the switching command DRTSW. Also, the NPN transistors Q9 to Q14 are turned on and off according to the drive signal DRV2. The inverter 20 switches between supply and non-supply of the electric current flowing to each phase of the AC motor M2 in synchronization with the true rise and fall of the switching command DRTSW Thus, even when the output of the resolver 40 (or the resolver 50) has a deviation, the AC motor M1 (or the AC motor M2) can be driven in synchronization with the true rise and fall of the switching command by correcting the deviation of the output of the resolver 40 (or the resolver 50).

Figure 6:
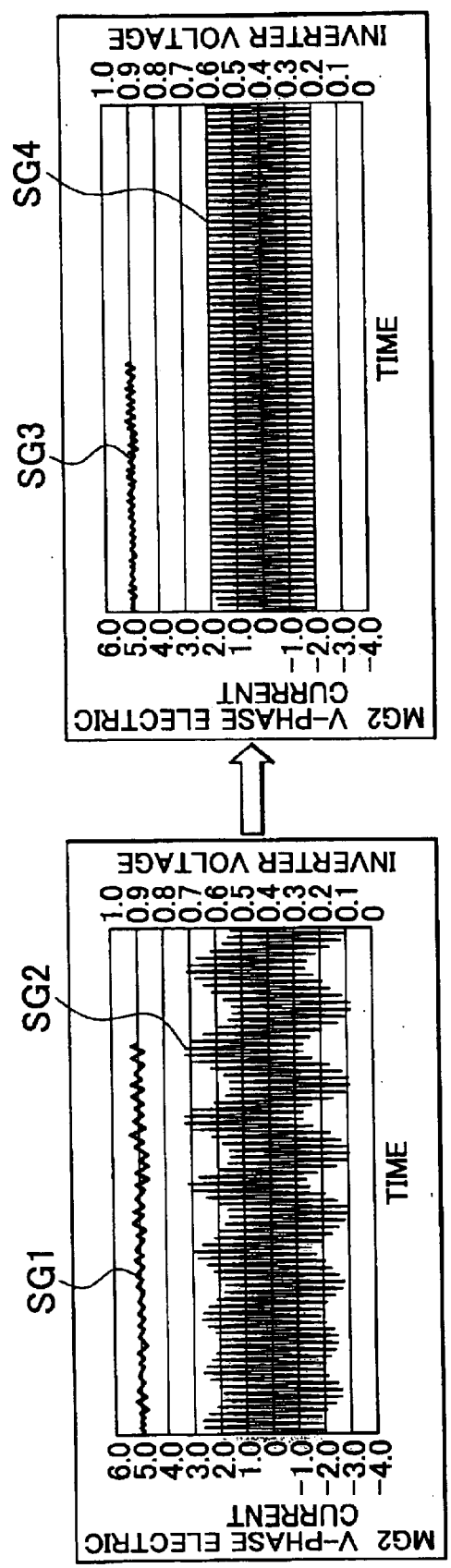
FIG. 6 is a timing chart showing fluctuations in a voltage and an electric current of one of two AC motors shown in FIG. 1 when electric power of the other AC motor fluctuates.

FIG. 6 shows fluctuations in the voltage and the electric current of the AC motor M2 when electric power of the AC motor M1 fluctuates in the case where the outputs of the resolvers 40, 50 are corrected, and in the case where the outputs of the resolvers 40, 50 are not corrected. Signals SG1, SG2 show the voltage and the electric current in the case where the outputs of the resolvers 40, 50 are not corrected. Signals SG3, SG4 show the voltage and the electric current in the case where the outputs of the resolvers 40, 50 are corrected.

As shown in FIG. 6, in the case where the outputs of the resolvers 40, 50 are not corrected, the fluctuations in the voltage SG1 and the electric current SG2 are increased with time, and finally the failure of the control occurs. Meanwhile, in the case where the outputs of the resolvers 40, 50 are corrected, the fluctuation in the voltage SG3 of the AC motor M2 is extremely small over the entire time, and the electric current SG4 hardly fluctuates.

Thus, the AC motors M1, M2 can be stably driven by correcting the outputs of the resolvers using a difference between the time interval from the reference time until the switching time based on the output of the resolver and the time interval from the reference time until the true switching time. Also, in the case where the two AC motors M1, M2 are driven, even when the fluctuation in the electric power of one AC motor M1 occurs, the fluctuation in the electric power is hardly transferred to the AC motor M2, and thus the failure of the control can be prevented.

In the embodiment described above, the time intervals T1 to T12 are measured using the U-phase of each of the AC motors M1, M2 as the reference phase. However, the invention is not limited to this reference phase, and the time intervals T1 to T12 may be measured using the V-phase or the W-phase as the reference phase.

[Second Embodiment]

Figure 7:
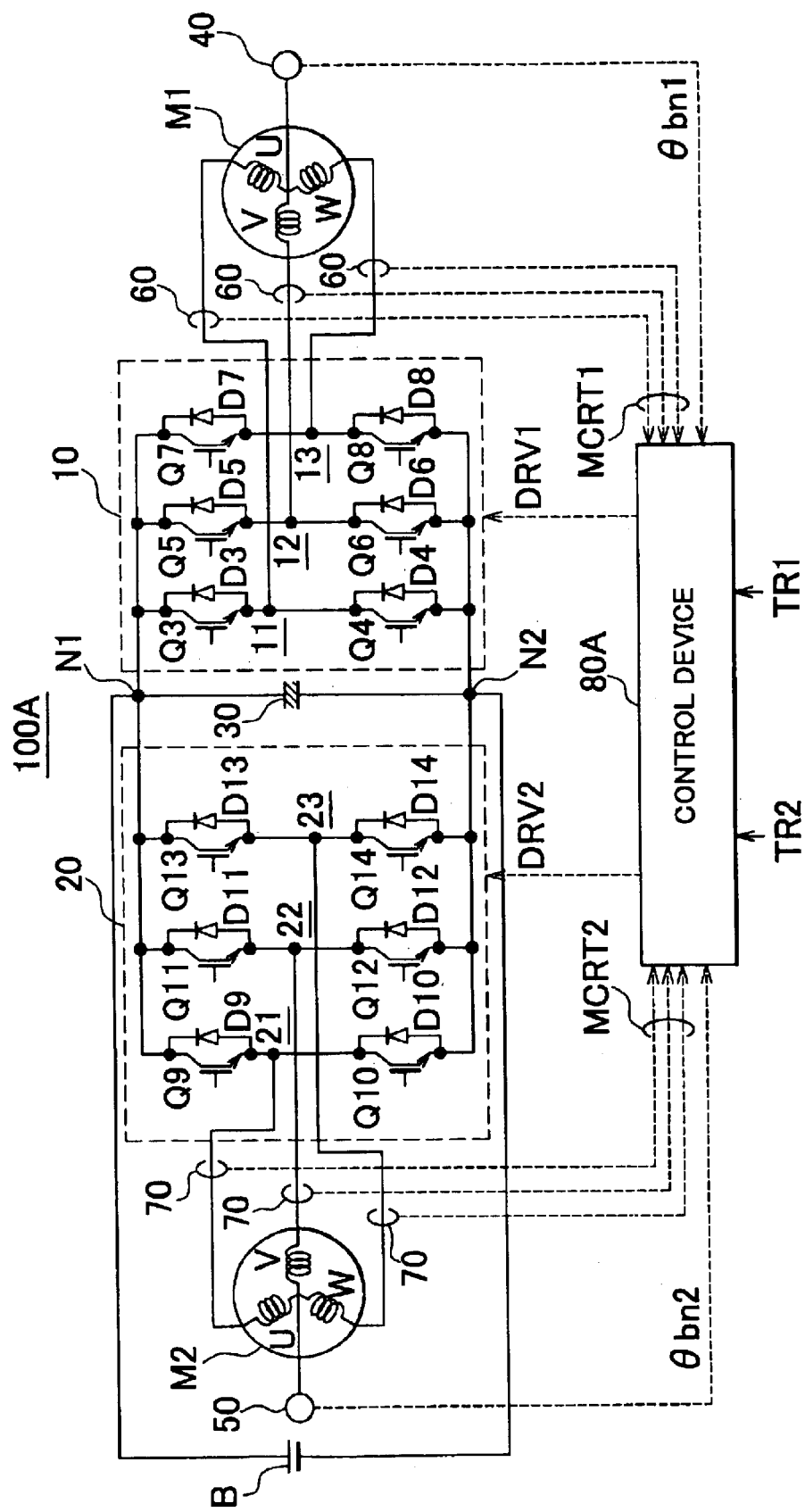
FIG. 7 is a schematic block diagram of a motor control apparatus according to a second embodiment of the invention.

As shown in FIG. 7, the configuration of a motor control apparatus 100A according to a second embodiment of the invention is the same as that of the control apparatus 100 according to the first embodiment of the invention, except that a control device 80A is used instead of the control device 80.

Figure 8:
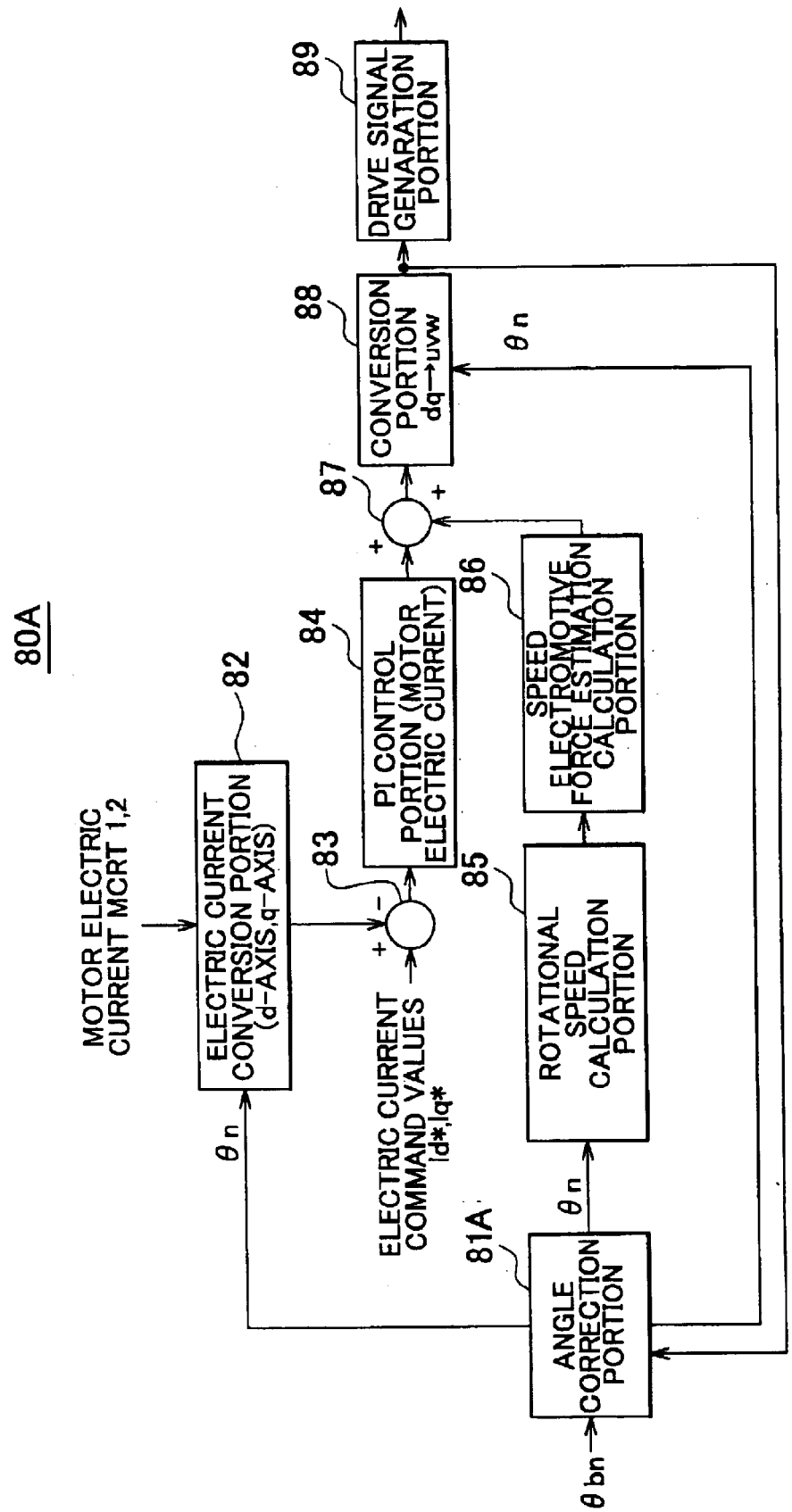
FIG. 8 is a functional block diagram describing functions of the control device shown in FIG. 7.

As shown in FIG. 8, the control device 80A includes an angle correction portion 81A instead of the angle correction portion 81 of the control device 80.

The angle correction portion 81A corrects each of the rotational angles θbn1, θbn2 output from each of the resolvers 40, 50 considering a change in the voltage phase command for each phase of each of the AC motors M1, M2. That is, the angle correction portion 81A corrects the rotational angle θbn based on the rotational angle θbn1 (or the rotational angle θbn2) output from the resolver 40 (or the resolver 50) and the voltage phase command values Vu1, Vv1, Vw1 (or the voltage phase command values Vu2, Vv2, Vw2) output from the conversion portion 88.

Figure 9:
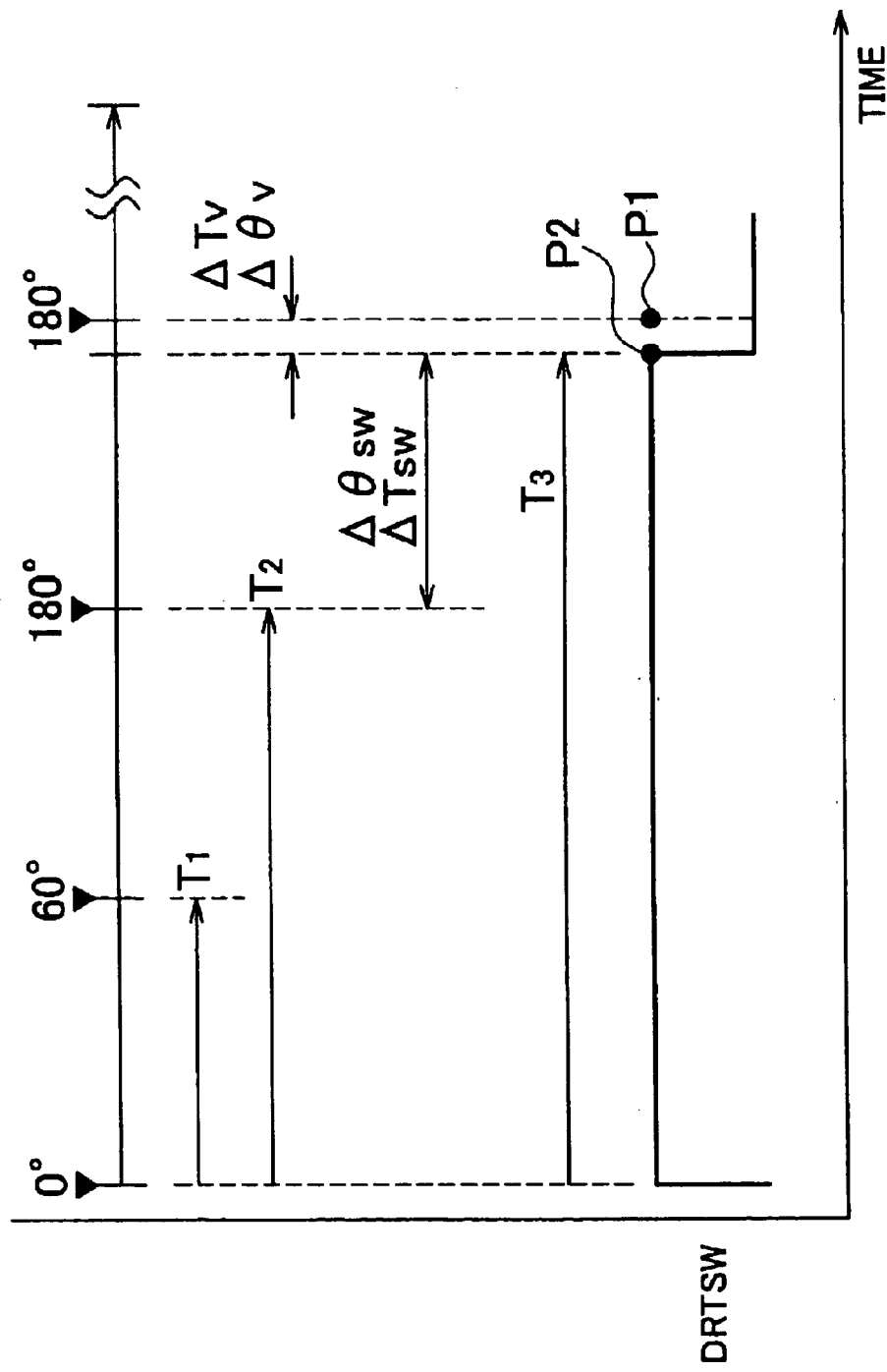
FIG. 9 is a timing chart for an output of a resolver shown in FIG. 7 and a voltage command.

A method of correcting the rotational angles θbn1, θbn2 in the angle correction portion 81A will be described with reference to FIG. 9. When the torque command value TR1 (or the torque command value TR2) for the AC motor M1 (or the AC motor M2) fluctuates, switching times at the intervals of 180 degrees in the switching command DRTSW for each phase are changed. That is, as the torque command value TR1 (or the torque command value TR2) is increased, the fall time of the switching command DRTSW is changed to a time shown by a point P2, which is before a time shown by a point P1 corresponding to the true rotational angle of 180 degrees. Also, as the torque command value TR1 (or the torque command value TR2) is decreased, the fall time of the switching command DRTSW is changed to a time (not shown), which is after the time shown by the point P1.

Thus, when the torque command value TR1 (or the torque command value TR2) fluctuates, the switching times at the intervals of 180 degrees in the voltage phase command for each phase of the AC motor M1 (or the AC motor M2) are changed. Therefore, in the second embodiment of the invention, the aforementioned correction for the rotational angles at the intervals of 60 degrees in the first embodiment is performed considering the change in the voltage phase command.

When the fall time of the switching command DRTSW at the rotational angle of 180 degrees is changed from the point P1 to the point P2, the angle correction portion 81A detects a rotational angle Δθsw and a deviation angle Δθv based on the voltage phase command values Vu1, Vv1, Vw1 (or the voltage phase command values Vu2, Vv2, Vw2) (i.e., the switching command DRTSW), and maintains the rotational angle Δθsw and the deviation angle Δθv. Also, the angle correction portion 81A measures the time intervals T1 to T12 using the timer included therein. Therefore, the angle correction portion 81A can calculate a time ΔTsw based on the time interval T2 and the time interval T3. Then, the angle correction portion 81A calculates a deviation time ΔTv by substituting the rotational angle Δθsw, the deviation angle Δθv, and the time ΔTsw.

[Equation 3]

$$\Delta Tv = \frac{\Delta \theta v}{\Delta \theta sw / \Delta Tsw} \quad (3)$$

The change in the voltage phase command occurs at the rotational angles of 180 degrees, 360 degrees, 540 degrees, and 720 degrees (0 degree) in one cycle. Accordingly, a time at which the true rotational angle becomes 720 degrees is obtained by summing the deviation time ΔTv calculated by the equation (3) and the measured time interval T12. Since the change in the voltage phase command influences each switching time at and after the rotational angle of 180 degrees, the angle correction portion 81A calculates the deviation angle Δθn at each rotational angle using the following equation instead of the equation (1).

[Equation 4]

$$\Delta \theta_1 = 60° - 720° \times \frac{T1}{T12 + \Delta Tv} \quad (4)$$

$$\Delta \theta_2 = 2 \times 60° - 720° \times \frac{T2}{T12 + \Delta Tv}$$

$$\Delta \theta_n = n \times 60° - 720° \times \frac{Tn + \Delta Tv}{T12 + \Delta Tv}$$

$(n = 3 \text{ to } 11)$

The angle correction portion 81A corrects each of the rotational angles at the intervals of 60 degrees by substituting the calculated deviation angle Δθn into the equation (2).

Thus, the angle correction portion 81A measures the time intervals T1 to T12 from the reference time until when the rotational angle θbn output from the resolver 40 (or the resolver 50) becomes n×60 degrees (n=1 to 12, i.e., 60 degrees to 720 degrees (0 degree)). Then, the angle correction portion 81A calculates the deviation time ΔTv in the voltage phase command at each of the rotational angles of 180 degrees, 360 degrees, 540 degrees, and 720 degrees (0 degree), using the measured time intervals T2, T3. Using the deviation time ΔTv, the angle correction portion 81A corrects the time intervals from the reference time until the rotational angle output from the resolver becomes 180 degrees, 240 degrees, 300 degrees, 360 degrees, 420 degrees, 480 degrees, 540 degrees, 600 degrees, 660 degrees, and 720 degrees by equations T3+ΔTv, T4+ΔTv, T5+ΔTv, T6+ΔTv, T7+ΔTv, T8+ΔTv, T9+ΔTv, T10+ΔTv, T11+ΔTv, and T12+ΔTv, respectively. Then, the angle correction portion 81A calculates the deviation angle Δθn at each of the rotational angles at the intervals of 60 degrees, using each of the corrected time intervals T3+ΔTv, T4+ΔTv, T5+ΔTv, T6+ΔTv, T7+ΔTv, T8+ΔTv, T9+ΔTv, T10+ΔTv, T11+ΔTv, and T12+ΔTv, and the measured time intervals T1, T2. After the angle correction portion 81A calculates the deviation angle Δθn, the angle correction portion 81A corrects each of the rotational angles at the intervals of 60 degrees by substituting the deviation angle Δθn into the equation (2).

Thus, the angle correction portion 81A calculates the deviation angle Δθn at each of the rotational angles at the intervals of 60 degrees considering the change in the voltage phase command.

Figure 10:
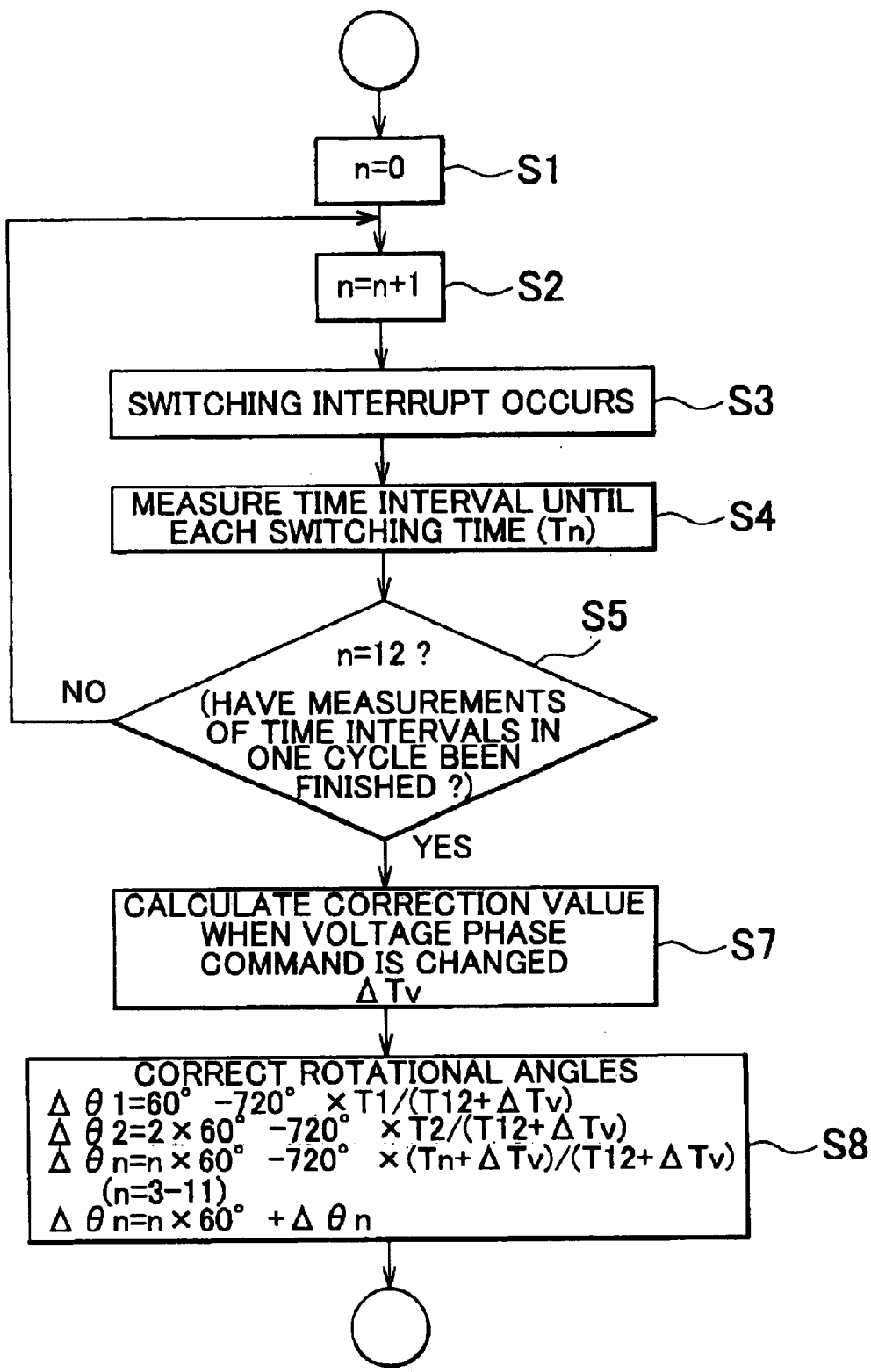
FIG. 10 is a flowchart describing a rotational angle correction method according to the second embodiment of the invention.

The rotational angle correction method according to the second embodiment of the invention will be described with reference to FIG. 10. A flowchart shown in FIG. 10 is the same as the flowchart shown in FIG. 5, except that step S6 is deleted, and step S7 and step S8 are added. After measurements of the time intervals T1 to T12 are finished (step S5), the angle correction portion 81A calculates the correction value, that is, the deviation time ΔTv when the voltage phase command is changed using the aforementioned equation (3) (step S7), and calculates the deviation angle Δθn at each of the rotational angles at the intervals of 60 degrees by substituting the correction value ΔTv and each of the measured time intervals T1 to T12 into the aforementioned equation (4). Then, the angle correction portion 81 corrects each of the rotational angles at the intervals of 60 degrees by substituting the deviation angle Δθn into the equation (2) (step S8). Thus, the operation of correcting the rotational angles at the intervals of 60 degrees is finished.

The entire operation of the motor control apparatus 100A is the same as that of the motor control apparatus 100, except that the operation of the angle correction portion 81A is performed instead of the operation of the angle correction portion 81 is performed.

Other operations are the same as in the first embodiment.

[Third Embodiment]

Figure 11:
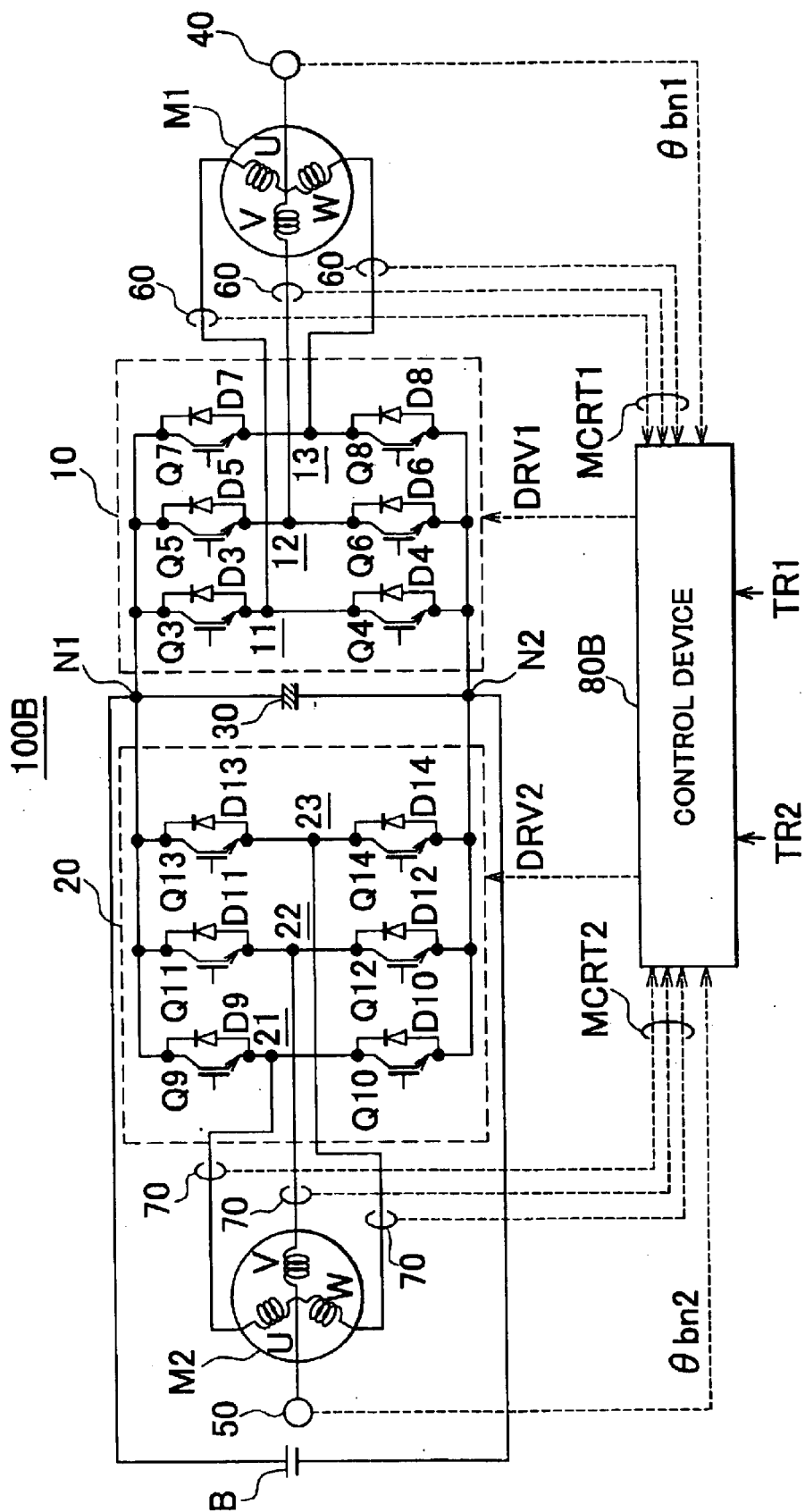
FIG. 11 is a schematic block diagram of a motor control apparatus according to a third embodiment of the invention.

As shown in FIG. 11, a motor control apparatus 100B according to a third embodiment of the invention is the same as the motor control apparatus 100, except that a control device 80B is used instead of the control device 80 of the motor control apparatus 100.

Figure 12:
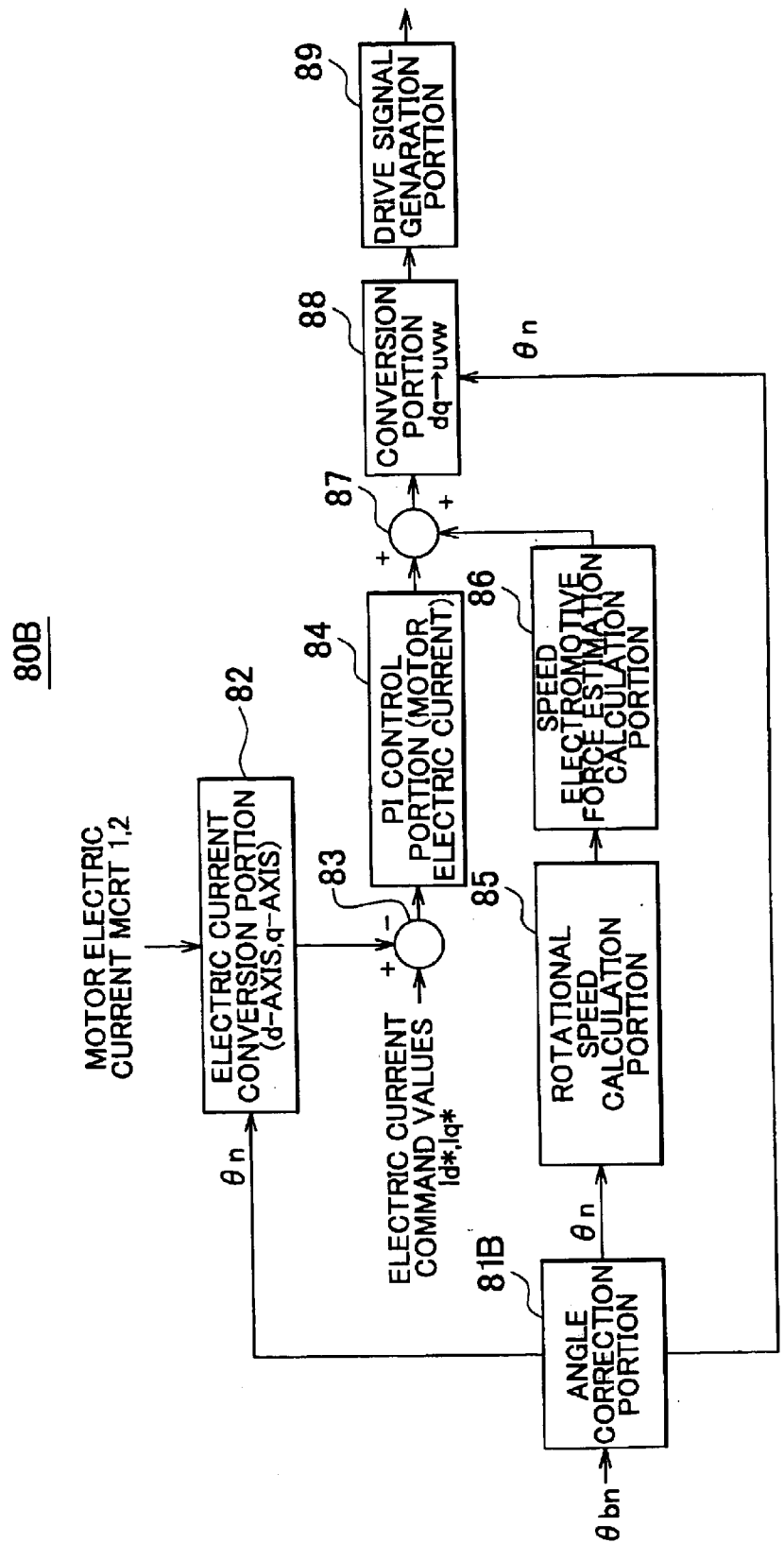
FIG. 12 is a functional block diagram describing functions of the control device shown in FIG. 11.

As shown in FIG. 12, the control device 80B includes an angle correction portion 81B instead of the angle correction portion 81 of the control device 80.

Figure 13:
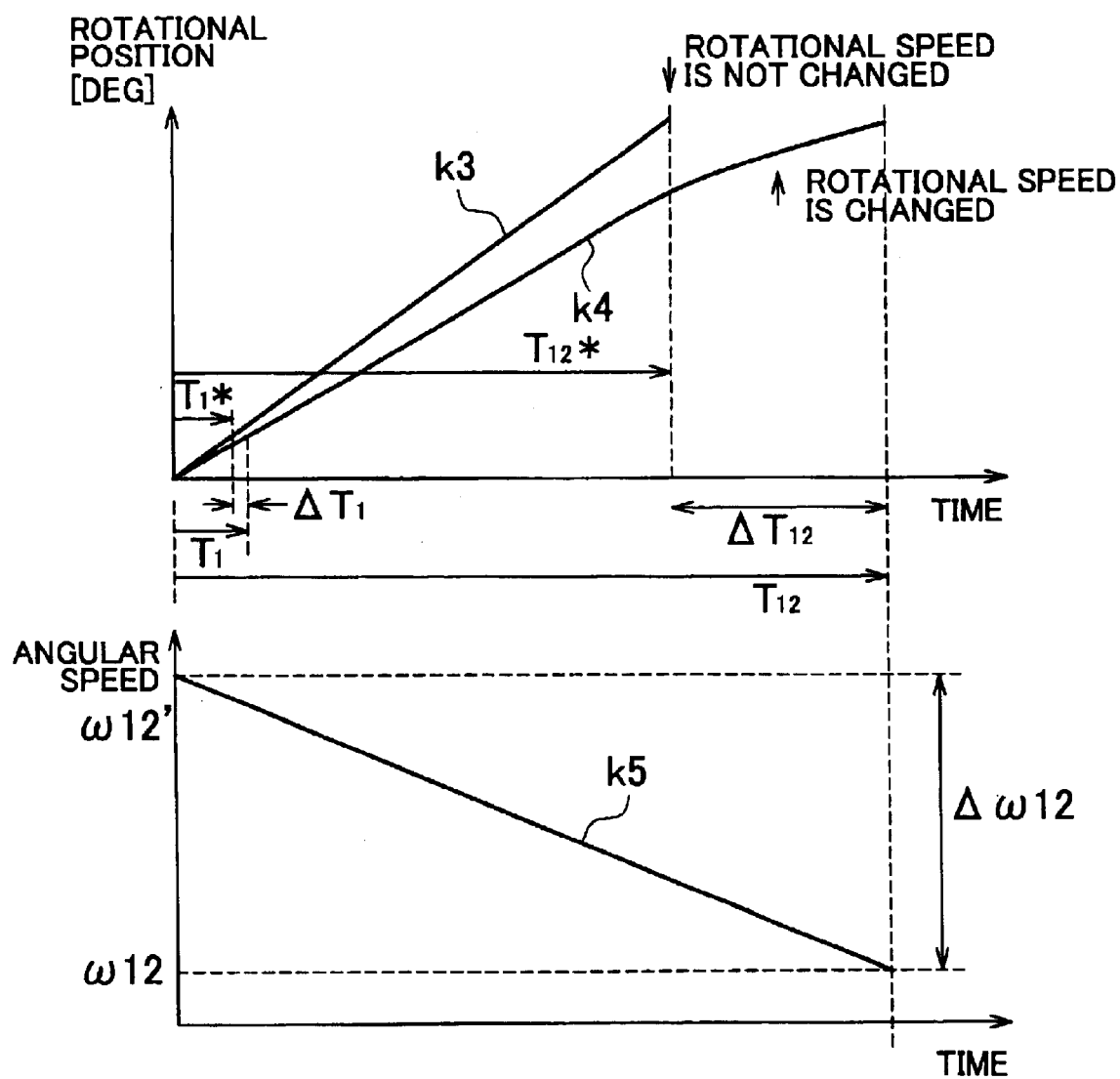
FIG. 13 is a timing chart showing an output of a resolver shown in FIG. 11 and a change in a rotational speed.

The angle correction portion 81B corrects the rotational angles at the intervals of 60 degrees considering a change in the rotational speed of each of the resolver 40 and the resolver 50. As shown in FIG. 13, when the rotational speed is not changed, the rotational angle θbn (θbn1 or θbn2) is linearly increased with time along a straight line k3. However, when the rotational speed is changed, the rotational angle θbn is not linearly increased with respect to time, as shown by a curved line k4.

In the invention, in the case where a rotational speed at a reference position is ω12', and a rotational speed when the resolver 40 (or the resolver 50) has been rotated by 720 degrees, that is, a rotational speed at the time interval T12 is ω12, it is assumed that the rotational speed is decreased at an average decreasing rate during the time interval T12 as shown by a straight line k5. That is, it is assumed that the acceleration of the rotation is constant, and the rotational speed is decreased by Δω12/12 every 60 degrees.

Thus, the rotational speed is changed from ω12' to ω12'+Δω12/12 at the rotational angle of 60 degrees. Accordingly, the following equation is obtained.

[Equation 5]
$$T1 = \frac{60°}{\omega 12' + \Delta\omega 12/12} \quad (5)$$

Since the angle correction portion 81B measures the time interval T1, the rate of change in the rotational speed every 60 degrees Δω12/12 can be calculated. A time interval T1\* until the first switching time in the case where the rotational speed is not changed is obtained by an equation T1\*=60°/ω12'. By modifying this equation using the equation (5), the following equation is obtained.

[Equation 6]
$$T1^* = T1 \times \frac{\omega 12' + \Delta\omega 12/12}{\omega 12'} \quad (6)$$

Since the value of the rotational speed ω12' is known, the time interval T1\* can be calculated by substituting the measured time interval T1, and the calculated rate of change in the rotational speed Δω12/12 into the equation (6). A time interval T12\* until the last switching time in the case where the rotational speed is not changed is obtained by subtracting a time interval ΔT12 from the measured time interval T12. That is, an equation T12\*=T12−ΔT12 is obtained.

Thus, the deviation angle Δθ1 at the rotational angle of 60 degrees is obtained by the following equation.

[Equation 7]
$$\Delta\theta 1 = 60° - 720° \times \frac{T1^*}{T12^*} \quad (7)$$

Also, the time interval T12\* is represented by the following equation in a manner similar to that in which the time interval T1\* is represented by the equation (6).

[Equation 8]
$$T12^* = T12 \times \frac{\omega 12' + \Delta\omega 12}{\omega 12'} \quad (8)$$

By substituting the equation (6) and the equation (8) into the equation (7), the deviation angle Δθ1 at the rotational angle of 60 degrees is finally obtained by the following equation.

[Equation 9]

$$\Delta\theta 1 = 60° - 720° \times \frac{T1\left(\omega 12' + \frac{\Delta\omega 12}{12}\right)}{T12(\omega 12' + \Delta\omega 12)} \quad (9)$$

Since the values of the time intervals T1, T12 are measured values, the value of $\Delta\omega 12$ can be calculated by the equation (5), and the value of $\omega 12'$ is known, the deviation angle $\Delta\theta 1$ can be calculated by the equation (9).

In general, the deviation angle $\Delta\theta n$ (n=1 to 11) at each of the rotational angles at the intervals of 60 degrees is obtained by the following equation.

[Equation 10]

$$\Delta\theta n = n \times 60° - 720° \times \frac{Tn\left(\omega 12' + n \times \frac{\Delta\omega 12}{12}\right)}{T12(\omega 12' + \Delta\omega 12)} \quad (10)$$

After the angle correction portion 81B obtains the deviation angle $\Delta\theta n$ at each of the rotational angles at the intervals of 60 degrees, the angle correction portion 81B corrects each of the rotational angles at the intervals of 60 degrees by substituting the deviation angle $\Delta\theta n$ into the equation (2).

Thus, the angle correction portion 81B calculates the deviation angle $\Delta\theta n$ at each of the rotational angles at the intervals of 60 degrees considering the change in the rotational speed.

The change in the rotational speed does not occur in every cycle, and occurs discontinuously. For example, there is a case where the change in the rotational speed did not occur in a previous cycle, but it occurs in a present cycle. Accordingly, in the invention, the rotational angles at the intervals of 60 degrees are corrected using a time required for rotating the rotor one time in the previous cycle in which the change in the rotational speed did not occur, and a time required for rotating the rotor one time in the present cycle in which the change in the rotational speed occurs.

Thus, the rotational angles can be corrected considering the previous cycle in which the change in the rotational speed did not occur, a deviation of the output can be corrected early.

Figure 14:
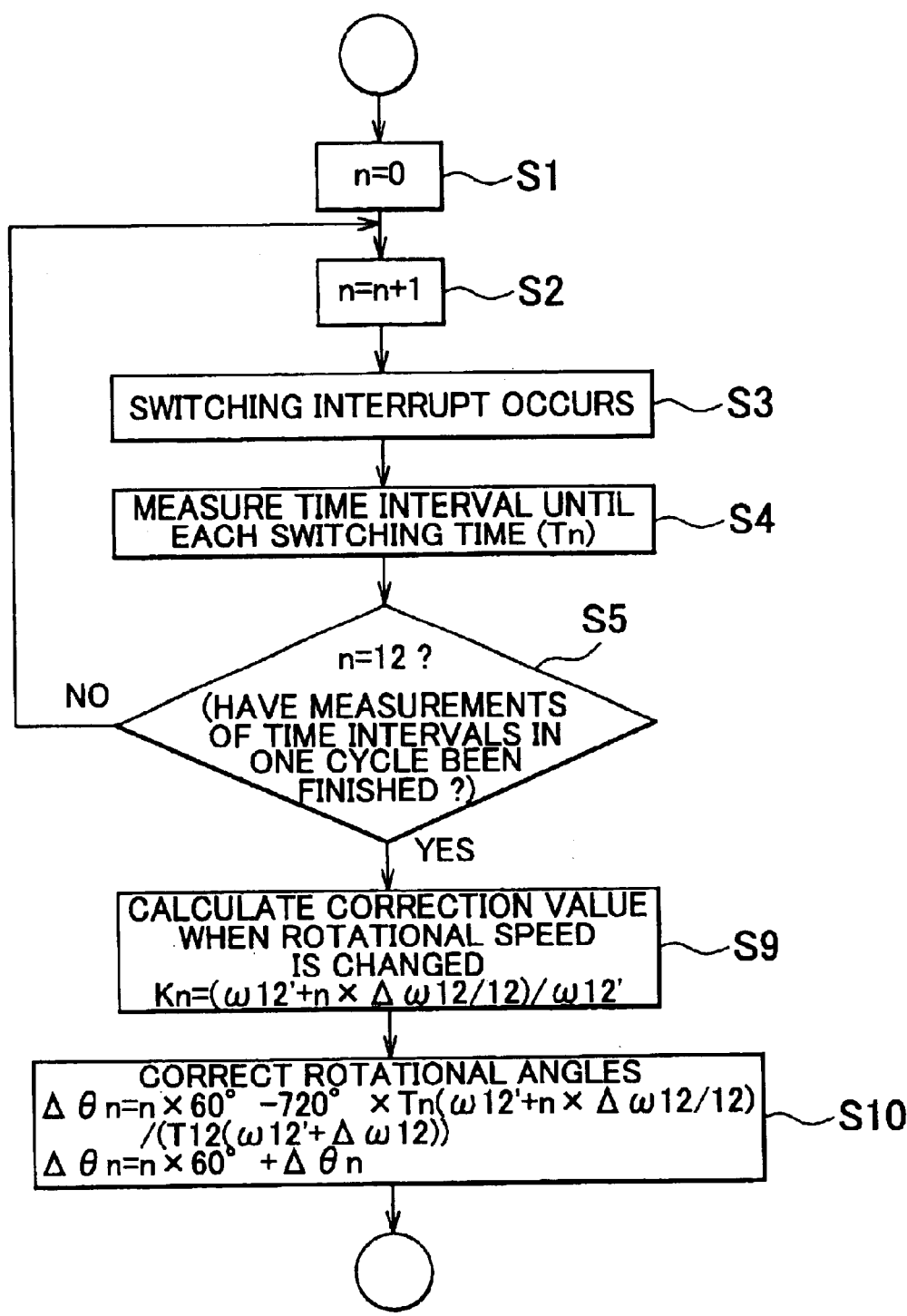
FIG. 14 is a flowchart describing a rotational angle correction method according to the third embodiment of the invention.

A rotational angle correction method according to a third embodiment of the invention will be described with reference to FIG. 14. A flowchart shown in FIG. 14 is the same as the flowchart in FIG. 5, except that step S6 is deleted, and step S9 and step S10 are added. After measurements of the time intervals T1 to T12 are finished (step S5), the angle correction portion 81B calculates a correction value Kn when the rotational speed is changed (step S9), and calculates the deviation angle $\Delta\theta n$ at each of the rotational angles at the intervals of 60 degrees by substituting the calculated correction value Kn and the measured time intervals T1 to T12 into the equation (10). The angle correction portion 81B corrects each of the rotational angles at the intervals of 60 degrees by substituting the calculated deviation angle $\Delta\theta n$ into the equation (2) (step S10). Thus, the operation of correcting the rotational angles at the intervals of 60 degrees considering the change in the rotational speed is finished.

The entire operation of the motor control apparatus 100B is the same as that of the motor control apparatus 100, except that the operation of the angle correction portion 81B is performed instead of the operation of the angle correction portion 81 is performed.

Other operations are the same as in the first embodiment.

[Fourth Embodiment]

Figure 15:
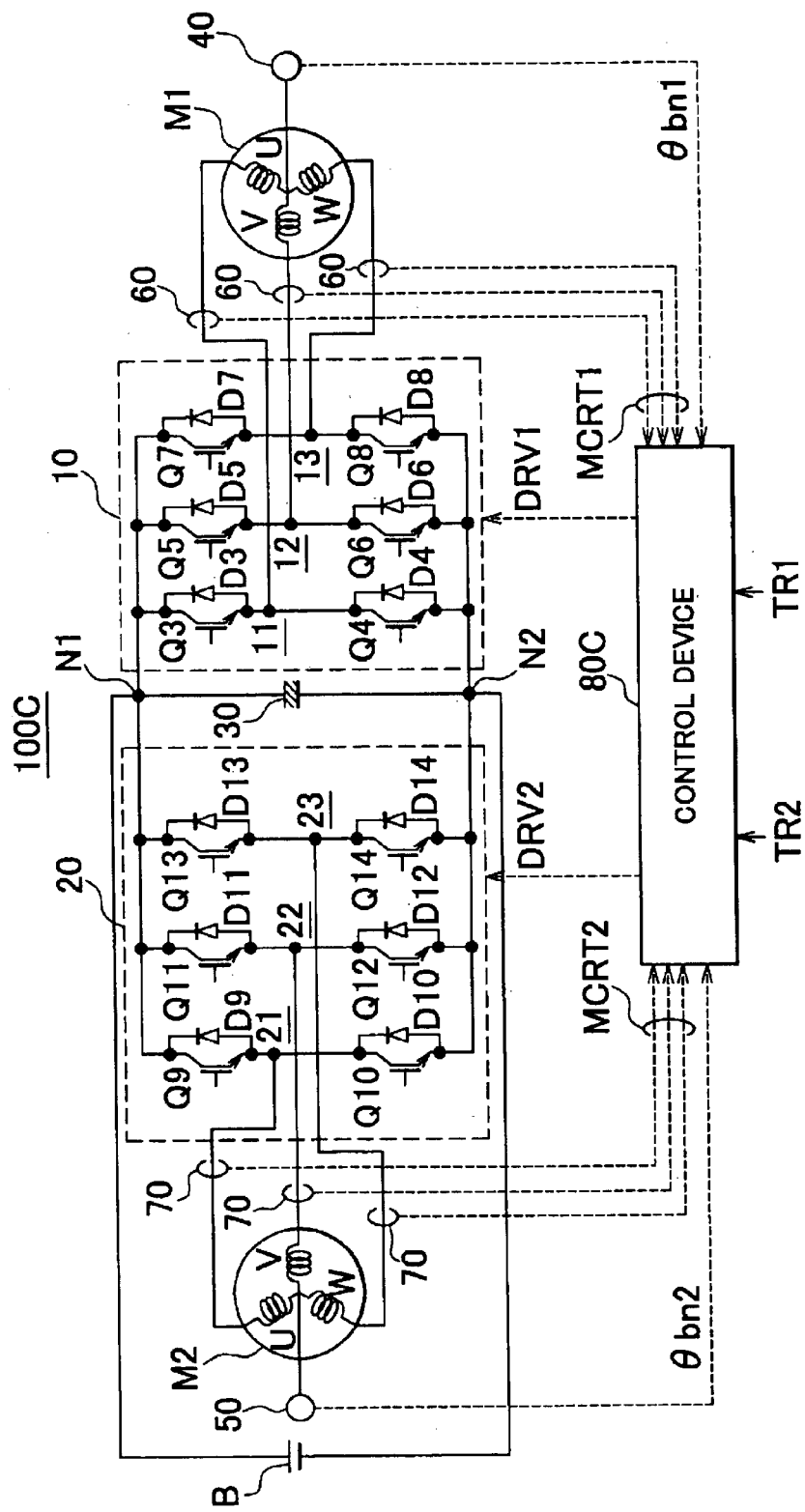
FIG. 15 is a schematic block diagram of a motor control apparatus according to a fourth embodiment of the invention.

As shown in FIG. 15, a motor control apparatus 100C according to a fourth embodiment is the same as the motor control apparatus 100, except that a control device 80C is used instead of the control device 80 of the motor control apparatus 100.

Figure 16:
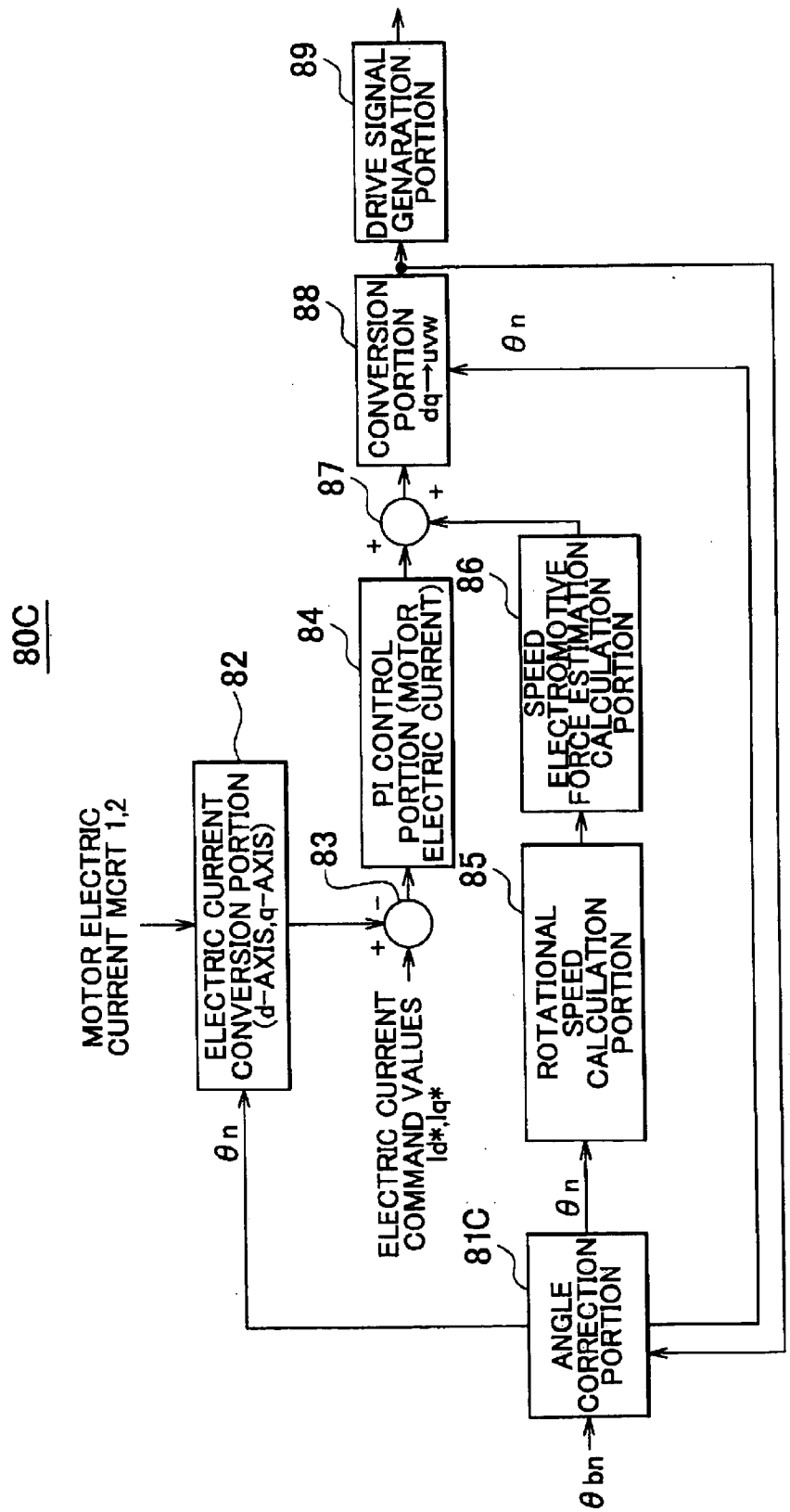
FIG. 16 is a functional block diagram describing functions of the control device shown in FIG. 15.

As shown in FIG. 16, the control device 80C includes an angle correction portion 81C instead of the angle correction portion 81 of the control device 80. The angle correction portion 81C measures the time intervals T1 to T12 and corrects the rotational angles at the intervals of 60 degrees considering the change in the voltage phase command and the change in the rotational speed. That is, the angle correction portion 81C has the functions of the angle correction portion 81, the angle correction portion 81A, and the angle correction portion 81B.

In this case, the angle correction portion 81C calculates the correction value $\Delta Tv$ when the voltage phase command is changed using the equation (3). Further, the angle correction portion 81C calculates the correction value Kn when the rotational speed is changed by an equation Kn=($\omega 12'$+n×$\Delta\omega 12/12$)/$\omega 12'$. Then, the angle correction portion 81C calculates the deviation angle $\Delta\theta 1$ at each of the rotational angles at the intervals of 60 degrees by substituting the calculated correction values $\Delta Tv$, Kn and the measured time intervals T1 to T12 into the following equation.

[Equation 11]

$$\Delta\theta_1 = 60° - 720° \times \frac{T1\left(\omega 12' + \frac{\Delta\omega 12}{12}\right)}{(T12 + \Delta Tv)(\omega 12' + \Delta\omega 12)} \quad (11)$$

$$\Delta\theta_2 = 2 \times 60° - 720° \times \frac{T2\left(\omega 12' + 2 \times \frac{\Delta\omega 12}{12}\right)}{(T12 + \Delta Tv)(\omega 12' + \Delta\omega 12)}$$

$$\Delta\theta_n = n \times 60° - 720° \times \frac{(Tn + \Delta Tv)\left(\omega 12' + n \times \frac{\Delta\omega 12}{12}\right)}{(T12 + \Delta Tv)(\omega 12' + \Delta\omega 12)}$$

(n = 3 to 11)

Then, the angle correction portion 81C corrects each of the rotational angles at the intervals of 60 degrees by substituting the calculated deviation angle $\Delta\theta n$ into the equation (2).

Figure 17:
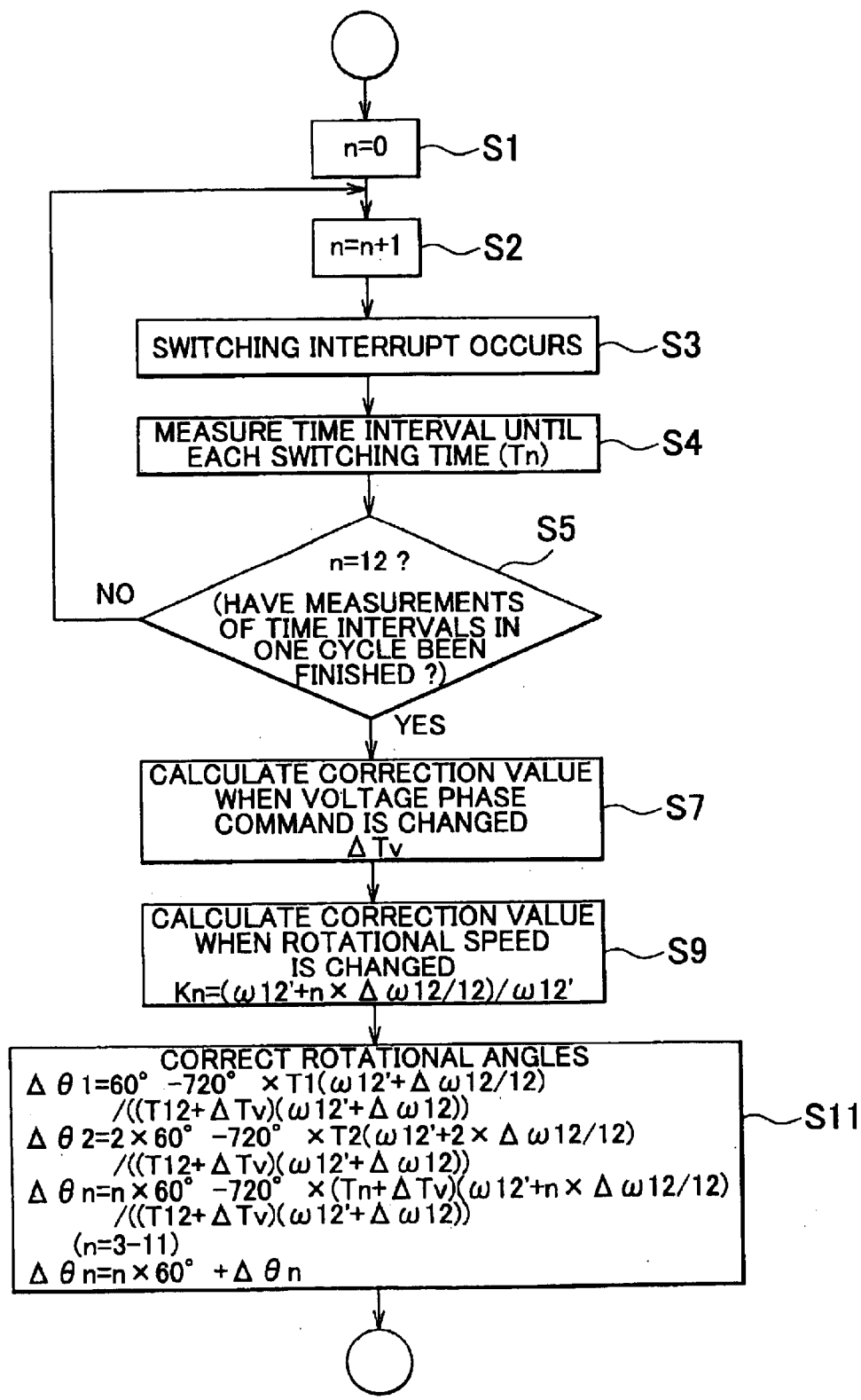
FIG. 17 is a flowchart describing a rotational angle correction method according to the fourth embodiment of the invention.

A rotational angle correction method according to a fourth embodiment of the invention will be described with reference to FIG. 17. A flowchart shown in FIG. 17 is the same as the flowchart shown in FIG. 5, except that step S6 is deleted, and step S7, step S9, and step S11 are added.

After measurements of the time intervals T1 to T12 are finished (step S5), the angle correction portion 81C calculates the correction value $\Delta Tv$ when the voltage phase command is changed using the equation (3) (step S7). Next, the angle correction portion 81C calculates the correction value Kn when the rotational speed is changed (step S9). Then, the angle correction portion 81C calculates the deviation angle $\Delta\theta n$ at each of the rotational angles at the intervals of 60 degrees by substituting the calculated correction values $\Delta Tv$, Kn, and the measured time intervals T1 to T12 into the equation (11), and corrects each of the rotational angles at the intervals of 60 degrees by substituting the calculated deviation angle $\Delta\theta n$ into the equation (2) (step S11). Thus, the operation of correcting the rotational angles at the intervals of 60 degrees considering the change in the voltage phase command and the change in the rotational speed is finished.

The entire operation of the motor control apparatus 100C is the same as that of the motor control apparatus 100, except that the operation of the angle correction portion 81C is performed instead of the operation of the angle correction portion 81 is performed.

Other operations are the same as in the first to third embodiments.

[Fifth Embodiment]

Figure 18:
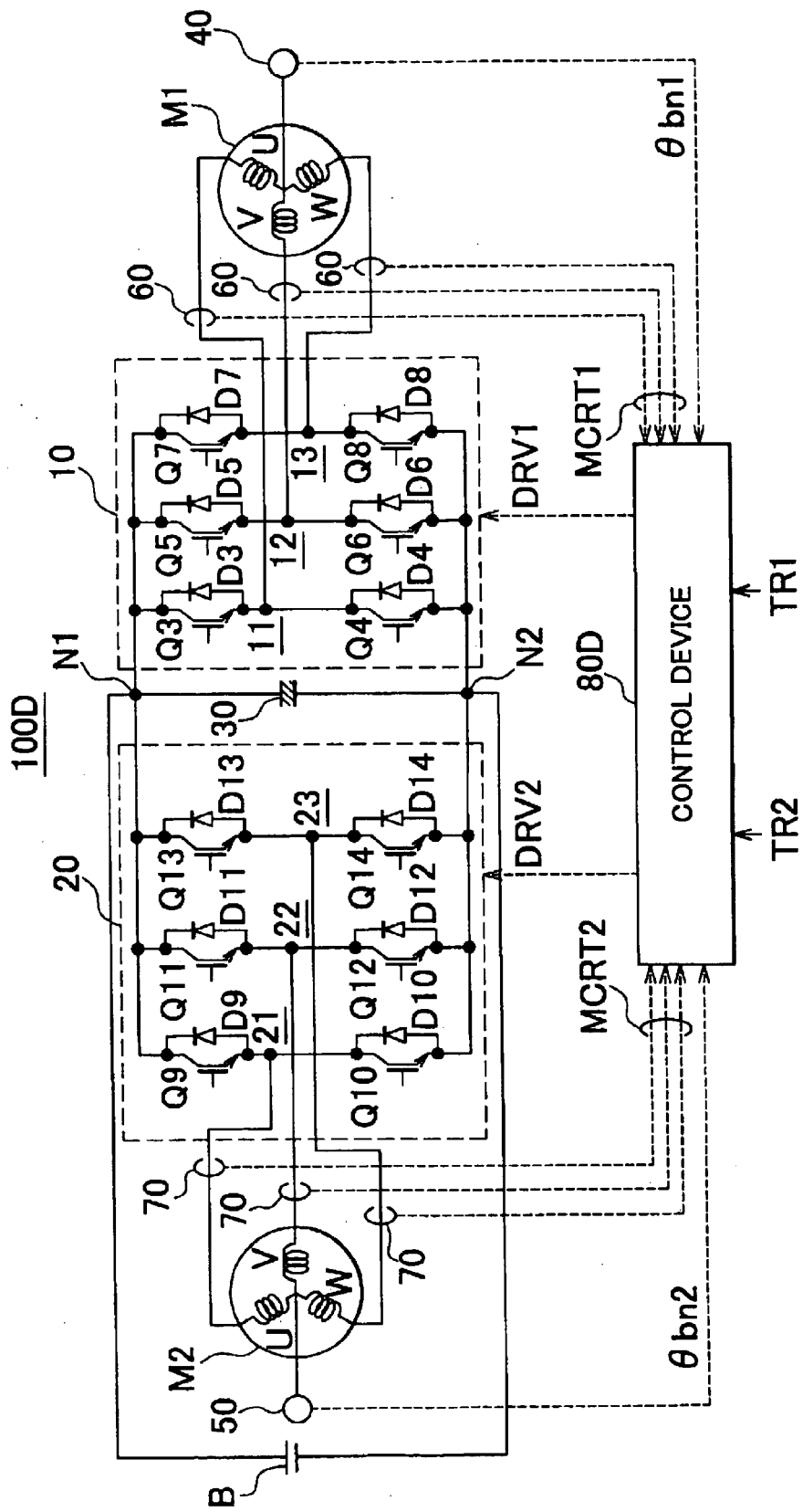
FIG. 18 is a schematic block diagram of a motor control apparatus according to a fifth embodiment of the invention.

As shown in FIG. 18, a motor control apparatus 100D according to a fifth embodiment is the same as the motor control apparatus 100, except that a control device 80D is used instead of the control device 80 of the motor control apparatus 100.

Figure 19:
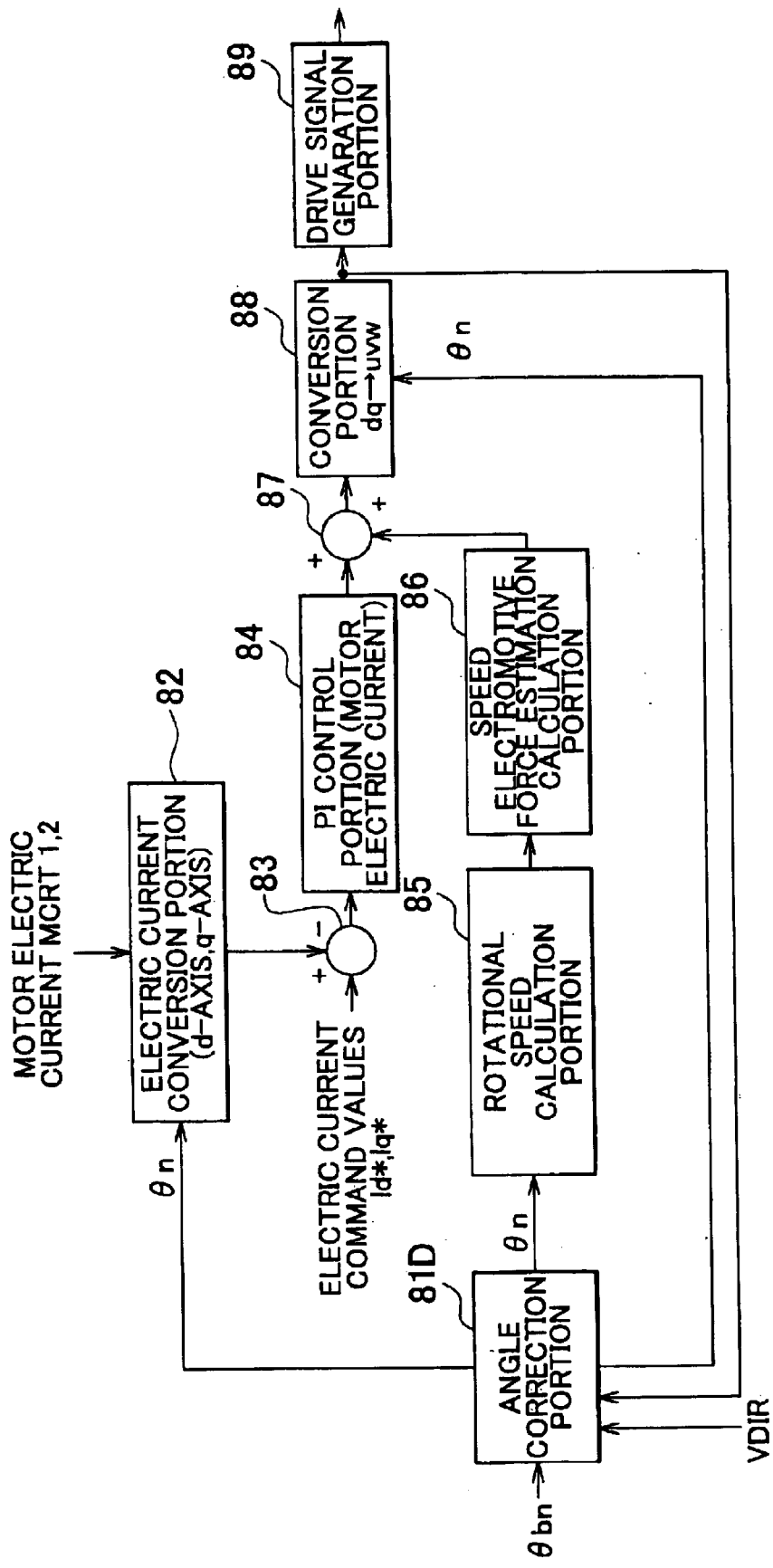
FIG. 19 is a functional block diagram describing functions of the control device shown in FIG. 18.

As shown in FIG. 19, the control device 80D includes an angle correction portion 81D instead of the angle correction portion 81 of the control device 80.

In the first to fourth embodiments described above, when the rotational angles at the intervals of 60 degrees are corrected, the deviation of the output of each of the resolvers 40, 50 needs to be measured in one cycle. Therefore, the deviation of the output of each of the resolvers 40, 50 cannot be corrected in one cycle immediately after a pulse width modulation control (hereinafter, referred to as a PWM control) is switched to the rectangular wave control.

In the fifth embodiment of the invention, the deviation is measured when the PWM control is performed before the rectangular wave control is performed, the output of each of the resolvers 40, 50 is corrected immediately after the PWM control is switched to the rectangular wave control, and the AC motors M1, M2 are driven based on the corrected output of each of the resolvers 40, 50.

Figure 20:
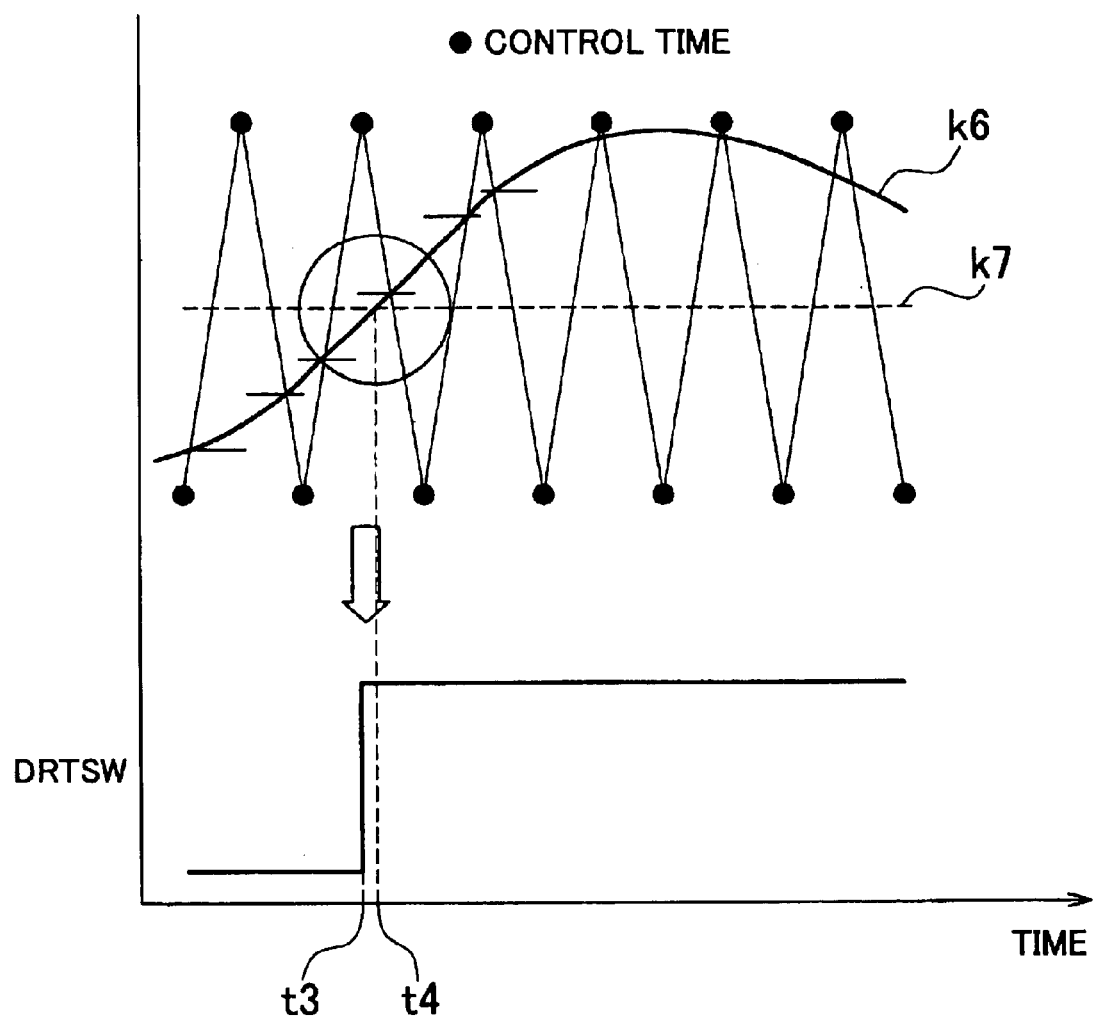
FIG. 20 is a timing chart for a voltage command.

As shown in FIG. 20, a voltage command for each phase shown by a curved line k6 crosses a zero level shown by a straight line k7 at time t4 during the PWM control. A deviation between the rotational angle θbn (θbn1 or θbn2) output from the resolver 40 or the resolver 50 at time t4, and the rotational angle at the rise time of the switching command DRTSW at time t3 or the fall time of the switching command DRTSW (i.e., the rotational angle of 180 degrees, 360 degrees, 540 degrees, or 720 degrees) is detected, and stored. When the PWM control is switched to the rectangular wave control, each of the rotational angles at the intervals of 60 degrees is corrected using the deviation that is detected and stored during the PWM control.

Since a zero-cross point at which the voltage command crosses the zero level during the PWM control is equivalent to the rise time or the fall time of the switching command (that is, the switching time in the switching command), the deviation of the output of each of the resolvers 40, 50 is detected at the zero-cross point in the voltage command during the PWM control.

The angle correction portion 81D receives the switching command DRTSW during the rectangular wave control from the conversion portion 88, and maintains the switching command DRTSW. Then, the angle correction portion 81D detects the aforementioned deviation based on a voltage command VDIR for each phase during the PWM control, and stores the deviation. When the PWM control is switched to the rectangular wave control, the angle correction portion 81D corrects each rotational angle θbn (θbn1 or θbn2) at the intervals of 60 degrees output from the resolver 40 or the resolver 50 using the stored deviation, and outputs the corrected rotational angle θn (θn1 or θn2) to the electric current conversion portion 82, the rotational speed calculation portion 85, and the conversion portion 88.

Thus, in the fifth embodiment of the invention, the rotational angles are corrected according to the control method for the motor (the rectangular wave control method). That is, when the rectangular wave control method is used, the deviation of the output of each of the resolvers 40, 50 at the zero-cross point at which the voltage command for each phase crosses the zero level is detected during the PMW control, whereby each of the rotational angles output from the resolvers 40, 50 during the rectangular wave control is corrected using the detected deviation. This correction method is employed considering that the zero-cross point at which the voltage command for each phase crosses the zero level during the PWM control is equivalent to the rise time or the fall time of the switching command. Thus, the correction method is suitable for the rectangular wave control.

The embodiment of the invention that has been disclosed in the specification is to be considered in all respects as illustrative and not restrictive. The scope of the invention is defined by claims, and not by description of the aforementioned embodiments, and all changes which come within the meaning and range of equivalency of the claims are therefore intended to be embraced therein.

What is claimed is:

1. A motor control apparatus comprising:
    a rotational position sensor which detects a rotational position of a rotor of a motor when a rectangular wave control of the motor is executed;
    correction means for correcting an output of the rotational position sensor on the basis of a difference in a time interval from a reference time until each control time of the motor in the rectangular wave control; and
    control means for executing the rectangular wave control of the motor based on the output of the rotational position sensor which is corrected by the correction means.

2. The motor control apparatus according to claim 1, wherein the correction means corrects the output of the rotational position sensor considering a change in a voltage phase command that decides a period during which a voltage is applied to each phase of the motor when the voltage phase command is changed.

3. The motor control apparatus according to claim 1, wherein the correction means corrects the output of the rotational position sensor considering a change in a rotational speed of the rotor when the rotational speed is changed.

4. The motor control apparatus according to claim 3, wherein the correction means corrects the output of the rotational position sensor considering a change in a rotational speed of the rotor by using a time required for rotating the rotor one time in a previous control cycle and a time required for rotating the rotor one time in a present control cycle.

5. The motor control apparatus according to claim 1, wherein the correction means corrects the output of the rotational position sensor considering a change in a voltage phase command that decides a period during which a voltage is applied to each phase of the motor and a change in a rotational speed of the rotor.

6. The motor control apparatus according to claim 5, wherein the correction means corrects the output of the rotational position sensor considering a change in a rotational speed of the rotor by using a time required for rotating the rotor one time in a previous control cycle and a time required for rotating the rotor one time in a present control cycle.

7. The motor control apparatus according to claim 1, wherein the correction means corrects the output of the rotational position sensor according to a kind of a control method for the motor.

8. A motor control method comprising the steps of:

detecting a rotational position of a rotor of a motor when a rectangular wave control of the motor is executed;

correcting an output of the rotational position on the basis of a difference between a time interval from a reference time until a control time at which the motor is controlled based on the output of the rotational position and a time interval from the reference time until a true control time at which the motor needs to be controlled in the rectangular wave control; and executing the rectangular wave control of the motor based on the output of the rotational position which is corrected.

9. The motor control method according to claim 8, wherein the correction corrects the output of the rotational position considering a change in a voltage phase command that decides a period during which a voltage is applied to each phase of the motor when the voltage phase command is changed.

10. The motor control method according to claim 8, wherein the correction corrects the output of the rotational position considering a change in a rotational speed of the rotor when the rotational speed is changed.

11. The motor control method according to claim 10, wherein the correction corrects the output of the rotational position considering a change in a rotational speed of the rotor by using a time required for rotating the rotor one time in a previous control cycle and a time required for rotating the rotor one time in a present control cycle.

12. The motor control method according to claim 8, wherein the correction corrects the output of the rotational position considering a change in a voltage phase command that decides a period during which a voltage is applied to each phase of the motor and a change in a rotational speed of the rotor.

13. The motor control method according to claim 12, wherein the correction corrects the output of the rotational position considering a change in a rotational speed of the rotor by using a time required for rotating the rotor one time in a previous control cycle and a time required for rotating the rotor one time in a present control cycle.

14. The motor control method according to claim 7, wherein the correction corrects the output of the rotational position sensor according to a kind of a control method for the motor.

15. A motor control apparatus comprising:

a rotational position sensor which detects a rotational position of a rotor of a motor when a rectangular wave control of the motor is executed;

a controller that corrects an output of the rotational position sensor on the basis of a difference between a time interval from a reference time until a control time at which the motor is controlled based on an output of the rotational position sensor and a time interval from the reference time until a true control time at which the motor needs to be controlled in the rectangular wave control, and executes the rectangular wave control of the motor based on the output of the rotational position sensor which is corrected.

16. A motor control apparatus comprising:

a rotational position sensor which detects a rotational position of a rotor of a motor when a rectangular wave control of the motor is executed;

correction means for correcting an output of the rotational position sensor on the basis of a difference between a time interval from a reference time until a control time at which the motor is controlled based on the output of the rotational position sensor and a time interval from the reference time until a true control time at which the motor needs to be controlled in the rectangular wave control; and control means for executing the rectangular wave control of the motor based on the output of the rotational position sensor which is corrected by the correction means.

* * * * *